US012475769B2

(12) United States Patent
Thibault

(10) Patent No.: US 12,475,769 B2
(45) Date of Patent: Nov. 18, 2025

(54) SMART SECURITY BARRIER SENSOR

(71) Applicant: Universal Electronics Inc., Scottsdale, AZ (US)

(72) Inventor: Thomas Thibault, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 112 days.

(21) Appl. No.: 18/307,901

(22) Filed: Apr. 27, 2023

(65) Prior Publication Data

US 2024/0078882 A1 Mar. 7, 2024

Related U.S. Application Data

(62) Division of application No. 17/322,220, filed on May 17, 2021, now Pat. No. 11,657,687.

(51) Int. Cl.
*G08B 13/08* (2006.01)
*G08B 25/00* (2006.01)

(52) U.S. Cl.
CPC .......... *G08B 13/08* (2013.01); *G08B 25/008* (2013.01)

(58) Field of Classification Search
CPC ........ G08B 13/00; G08B 13/08; G08B 13/16; G08B 13/1618; G08B 13/196; G08B 13/19695; G08B 13/24; G08B 21/00; G08B 21/04; G08B 21/0415; G08B 21/0469; G08B 25/00; G08B 25/008; H04W 4/02; H04W 4/22
See application file for complete search history.

(56) References Cited

U.S. PATENT DOCUMENTS

| | | | |
|---|---|---|---|
| 4,639,902 | A | 1/1987 | Leverance et al. |
| 5,534,849 | A | 7/1996 | McDonald et al. |
| 5,656,900 | A | 8/1997 | Michel et al. |
| 5,712,621 | A | 1/1998 | Anderson |
| 5,769,011 | A | 6/1998 | Daniel |
| 5,872,514 | A | 2/1999 | Neas |
| 5,936,522 | A | 8/1999 | Vogt |
| 6,225,903 | B1 | 5/2001 | Soloway et al. |
| 6,310,549 | B1 | 10/2001 | Loftin et al. |

(Continued)

FOREIGN PATENT DOCUMENTS

| | | | |
|---|---|---|---|
| EP | 3754311 | A1 | 12/2020 |
| JP | 10-239450 | A | 9/1998 |

(Continued)

OTHER PUBLICATIONS

ISA/US, Int. Search Report and Written Opinion issued on PCT/US16/17807, dated May 6, 2016, 13 pages.

(Continued)

*Primary Examiner* — Van T Trieu
(74) *Attorney, Agent, or Firm* — Greenberg Traurig, LLP

(57) ABSTRACT

A system, method and apparatus for monitoring a barrier. The barrier sensor refrains from transmitting an alarm signal to a receiver when the barrier sensor determines that the barrier has been placed into an open position and that a human being is inside the premises in proximity to the human detection device. Further, the barrier sensor transmits an alarm signal to a receiver when the barrier sensor determines that the barrier has been moved from the open position and that a human being is not inside the premises in proximity to the barrier.

14 Claims, 16 Drawing Sheets

(56) References Cited

U.S. PATENT DOCUMENTS 6,388,572 B1 5/2002 Salter
6,392,547 B1 5/2002 Stewart
6,542,071 B1 4/2003 Ohtsubo et al.
6,778,086 B2 8/2004 Morrone et al.
6,919,918 B2 7/2005 Carretero Guerrero
6,943,686 B2 9/2005 Allen
7,242,297 B2 7/2007 Vogt
7,456,736 B2 11/2008 Primm et al.
7,504,942 B2 3/2009 Marman
7,692,542 B2 4/2010 Outzs
7,916,018 B2 3/2011 Eskildsen
8,009,041 B2 8/2011 Graichen
8,230,645 B2 7/2012 Luca et al.
8,400,301 B1 3/2013 Kersch
8,773,263 B2 7/2014 Thibault
9,064,394 B1 6/2015 Trundle
9,245,439 B2 1/2016 Lamb
9,251,677 B1 2/2016 Mika
9,305,445 B1 4/2016 Hanning
9,558,639 B2 1/2017 Modi et al.
9,959,745 B2 5/2018 Lamb
10,087,679 B2 10/2018 Gitman
10,692,340 B2 6/2020 Seelman
11,227,482 B1 * 1/2022 Thibault .............. G08B 25/008
2001/0056579 A1 12/2001 Kogane et al.
2003/0218541 A1 11/2003 Sakai
2004/0021778 A1 2/2004 Oldani et al.
2004/0090327 A1 5/2004 Soloway et al.
2006/0092011 A1 5/2006 Simon et al.
2006/0170572 A1 8/2006 Kurachi et al.
2006/0181401 A1 8/2006 Martin
2006/0288527 A1 12/2006 Van Vliet
2007/0069894 A1 3/2007 Lee et al.
2007/0089467 A1 4/2007 Ace-Kirker
2007/0132578 A1 6/2007 Powell
2007/0139195 A1 6/2007 Jin et al.
2007/0182540 A1 8/2007 Marman
2008/0157964 A1 7/2008 Eskildsen et al.
2008/0186173 A1 8/2008 Gates
2009/0140858 A1 6/2009 Gore et al.
2009/0167538 A1 7/2009 Merritt et al.
2009/0309723 A1 12/2009 Freebody et al.
2010/0139170 A1 * 6/2010 Planck .................... E06B 11/02
49/506
2010/0245088 A1 9/2010 Meier et al.
2011/0026568 A1 2/2011 Hadizad et al.
2013/0057404 A1 3/2013 Thibault
2013/0076513 A1 3/2013 Eskildsen et al.
2013/0249730 A1 9/2013 Adcook
2013/0257611 A1 10/2013 Lamb et al.
2015/0084779 A1 3/2015 Saladin et al.
2015/0097669 A1 4/2015 Li
2016/0093179 A1 3/2016 Hanning
2016/0189496 A1 6/2016 Modi et al.
2017/0132888 A1 * 5/2017 Conlon ................ G08B 29/188
2018/0005511 A1 1/2018 Herrala
2019/0035242 A1 * 1/2019 Vazirani ........... G08B 13/19695
2019/0096202 A1 3/2019 Seelman
2020/0312104 A1 10/2020 Seelman

FOREIGN PATENT DOCUMENTS

JP 2004310495 A 11/2004
WO 2007111802 A2 10/2007

OTHER PUBLICATIONS

ISA/US, International Search Report and Written Opinion issued on PCT application No. US19/56176, dated Nov. 8, 2019, 9 pages.
JPO, Office Action issued on Japanese patent application No. 2017-544674, 28 pages.
ISA/US, Int. Search Report and Written Opinion issued on PCT application No. PCT/US22/27488, dated Jul. 25, 2022, 23 pages.
NPL Search (Jul. 7, 2022).
Extended Search Report from European application No. 22805169.4, dated Dec. 3, 2024, 15 pp.

* cited by examiner

SMART SECURITY BARRIER SENSOR

CROSS-REFERENCE TO RELATED APPLICATIONS

This application is a divisional of U.S. patent application Ser. No. 17/322,220, filed on May 17, 2021.

BACKGROUND

Field of Use

The present application relates to the field of home security. More specifically, the present application relates to a smart security sensor that helps reduce the occurrence of false alarms while also allowing barriers, such as doors and windows, to be opened while continuing to be monitored.

Description of the Related Art

Security systems for homes and businesses have been around for many years. Often, these systems make use of barrier sensors, such as door and window sensors, motion detectors, sound detectors, etc. Door and window alarms typically comprise two distinct parts: a magnet and a reed switch/transmitter assembly. The reed switch/transmitter assembly is typically installed onto a stationary surface, such as a door or window frame, while the magnet is mounted to a movable portion of a door or window. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of a local alarm condition, and a signal may be generated by circuitry located within the reed switch assembly and sent, via wires or over-the-air, to a central security panel or gateway in the home, which may forward the signal to a remote monitoring station. In addition, a loud audible alert is typically generated, either at the central security panel in the home or directly by the circuitry within the reed switch assembly, indicating that a door or window has been opened.

One problem with security systems is the relatively frequent occurrence of false alarms. Most security systems offer a "home" arming feature which arms all door and window sensors but do not arm any interior motion sensors. In this way, occupants are protected against intruders while being able to move about within the home without causing motion sensors to alarm. Often times, occupants forget that the security system is armed, and when they open a door or a window, a false alarm is triggered. These false alarms sometimes cause a response by police or fire personnel, wasting valuable public resources. Additionally, homeowners may be fined if too many false alarms occur within a certain time period.

One solution to the above problem is to provide a specialized security system that can determine when a door or window is opened from a person within a premises. In such systems, no alarm is sounded when a door or window is opened by someone inside the premises when system is in an armed state. While this solution solves the problem described above, it does not allow an open window to be monitored after it is opened. In other words, if a window is left open, an intruder can enter the premises through the open window without triggering the security system.

It would be desirable to provide a security system that allows occupants to open doors or windows while the security system is in an armed, "home" mode of operation, as well as to continue monitoring any open doors or windows once they have been opened.

SUMMARY

The embodiments described herein relate to methods, systems, and apparatus for monitoring a barrier and/or barrier sensor. In one embodiment, a barrier sensor is described, comprising a human detection device for determining when a human being is inside a monitored premises in proximity to the barrier, a transmitter for transmitting an alarm signal to a receiver, a memory having processor-executable instructions stored thereon, and a processor coupled to the human detection device, the transmitter and the memory for executing the processor-executable instructions that cause the barrier sensor to refrain, by the processor, from transmitting the alarm signal to the receiver when the processor determines that the barrier has been placed into an open position and that a human being is inside the premises in proximity to the human detection device, and transmit the alarm signal to the receiver when the processor determines that the barrier has been moved from the open position and that a human being is not inside the premises in proximity to the human detection device.

In another embodiment, a remote server for monitoring a barrier sensor inside a premises is described, comprising a network interface, a memory for storing processor-executable instructions, and a processor, coupled to the network interface and the memory, for executing the processor-executable instructions that causes the server to receive, via the network interface, a first status message from the barrier sensor that the barrier has been placed into an open position and that a human being is in proximity to the barrier inside the premises when the barrier is placed into the open position, in response to receiving the first status message, refrain from causing an escalated alarm response from occurring, receive, via the network interface, a second status message from the barrier sensor that the barrier has been moved from the open position and that a human being is not in proximity to the barrier inside the premises when the barrier is moved from the open position, and in response to receiving the second status message, causing an escalated alarm response to occur.

In yet another embodiment, a method performed by a barrier sensor is described, comprising refraining from transmitting an alarm signal to a receiver when the barrier sensor determines that the barrier has been placed into an open position and that a human being is inside the premises in proximity to the human detection device, and transmitting the alarm signal to the receiver when the barrier sensor determines that the barrier has been moved from the open position and that a human being is not inside the premises in proximity to the barrier.

In yet still another embodiment, a method, for monitoring a barrier sensor inside a premises is described, performed by a remote server, comprising receiving a first status message from the barrier sensor that the barrier has been placed into an open position and that a human being is in proximity to the barrier inside the premises when the barrier is placed into the open position, in response to receiving the first status message, refraining from causing an escalated alarm response to occur, receiving a second status message from the barrier sensor that the barrier has been moved from the open position and that a human being is not in proximity to the barrier inside the premises when the barrier is moved from the open position, and in response to receiving the second status message, causing an escalated alarm response to occur.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention relate to barrier sensors, such as door or window sensors, that have a capability of allowing a barrier to be opened without triggering an alarm, as well as being able to continue monitoring the barrier for movement after it has been opened. The principle theory of operation is that if a door or window is opened by someone inside a premises, it is assumed that the person is authorized to open a barrier, and an escalated alarm response should not be generated when a barrier is opened. Conversely, if a barrier is opened by someone outside of a premises, it is assumed that the person is not authorized to be inside the premises, and an escalated alarm response should be initiated. For example, when a person is at home and a home security system is in an armed-home mode of operation, the person may open a door or a window without causing an escalated alarm response, i.e., sounding a loud siren inside/outside the home, energizing a strobe light in the home, and/or contacting a remote security monitoring center. Once the barrier has been opened, the barrier is further monitored to ensure that it is not opened further by someone not inside the home. For the purpose of the discussions herein, the term "barrier" means any physical obstruction to a building, premises, residence or other structure, such as a door, a window, a garage door, an outdoor gate, etc. The term "barrier sensor" means any device used to monitor and report states, physical conditions, attributes, status, or parameters of a barrier. Examples of barrier sensors comprise door and window sensors, glass breakage detectors, light interruption detectors, etc.

Figure 1:
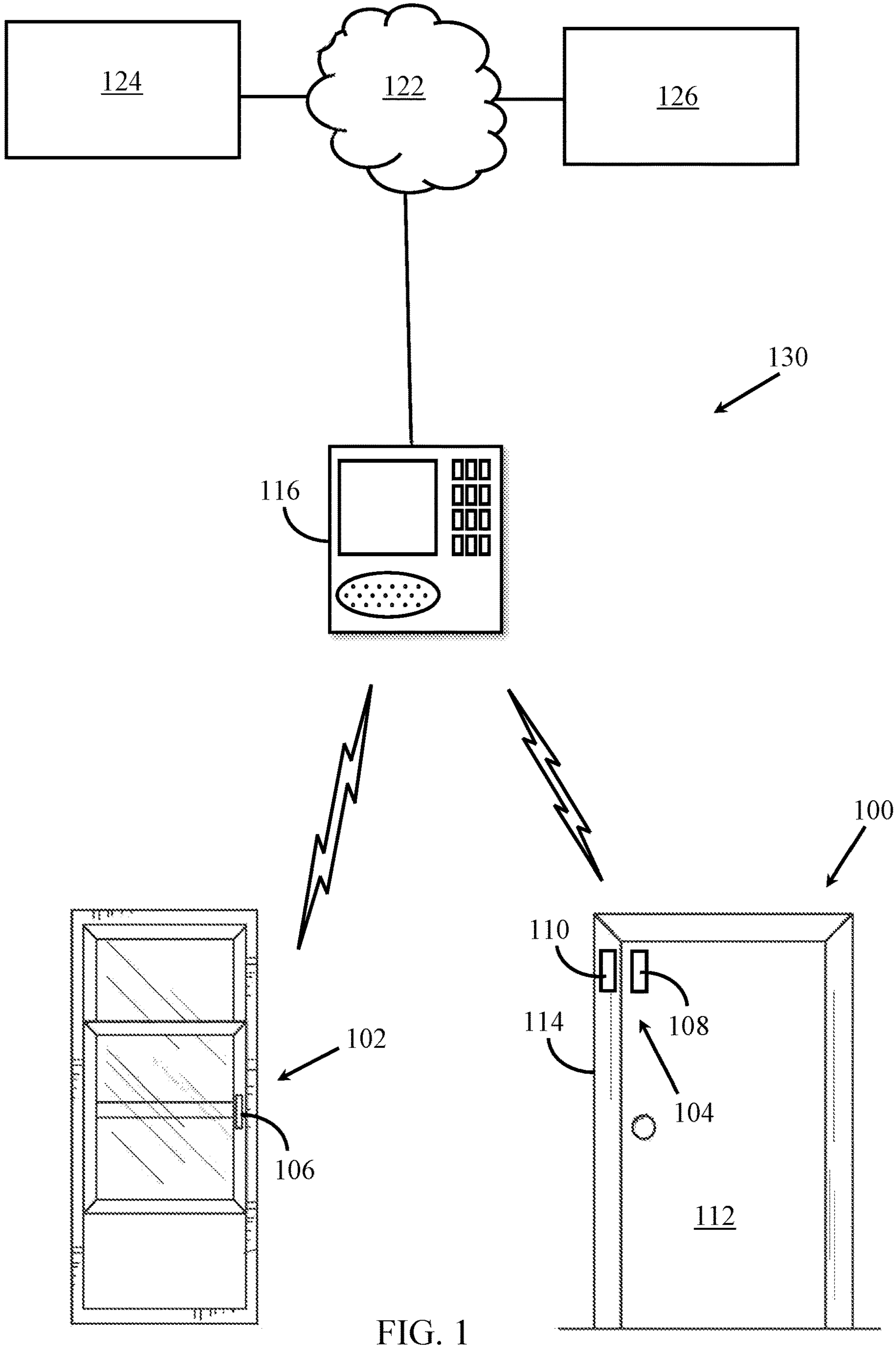
FIG. 1 is an illustration of a security system in accordance with one embodiment of the principles discussed herein.

FIG. 1 is an illustration of a security system 130 in accordance with one embodiment of the principles discussed herein. In this embodiment, security system 130 comprises a barrier sensor 104 monitoring a door assembly 100, a barrier sensor 106 monitoring window assembly 102, a receiver 116 for receiving alarm signals from either or both of the barrier sensors when a door assembly 100 or window assembly 102 is opened, closed, and/or moved from an open position into either a different open position or into a closed position, and for causing an escalated alarm response to occur when security system 130 is in an armed-home state (i.e., receiver 116 or remote server 126 monitoring only barrier alarms and not interior alarms such as motion sensors) and an alarm signal is received. In another embodiment, receiver 116 comprises a hub or gateway that routes alarm signals and other signals between the barrier sensors and a remote server 126 via wide-area network 122, where remote server 126 determines whether or not to cause an escalated alarm response to occur based on the signals from the barrier sensors. In the embodiment shown in FIG. 1, barrier sensor 104 comprises magnet 108 mounted to door 112 and reed switch assembly 110 mounted to door frame 114, while barrier sensor 106 comprises a magnet-less sensor. In some embodiments, reed switch assembly 110 may be mounted to a door or to a window with a corresponding magnet mounted to a door or window frame.

Each of the barrier sensors communicates with receiver 116 and/or remote server 126, each for providing centralized monitoring of the sensors. Receiver 116 may comprise a well-known professional-grade central security monitoring panel that receives RF signals generated by the barrier sensors, such as alarm signals when a barrier has been opened and/or closed, supervisory signals, sensor status signals such as "low battery" or when tampering has occurred. Receiver 116 causes one or more enhanced security responses to occur when a barrier is opened while security system 130 is in an armed-home mode of operation, such as to sound a loud siren located inside or outside of the premises, causing illumination of a bright strobe light, and/or to contact remote monitoring center 124 to alert personnel at remote monitoring center 124 that a potential break-in is occurring. Similarly, remote server 126 may perform these functions as alarm signals are received from the barrier sensors via receiver 116 (in this case a hub, router, gateway, etc.) and wide-area network 122 (such as the Internet). In this embodiment, remote server 126 may send signals to one or more sirens or strobe lights located inside the premises via wide-area network 122 and receiver 116 and/or send alerts to remote monitoring center 124.

Figure 2:
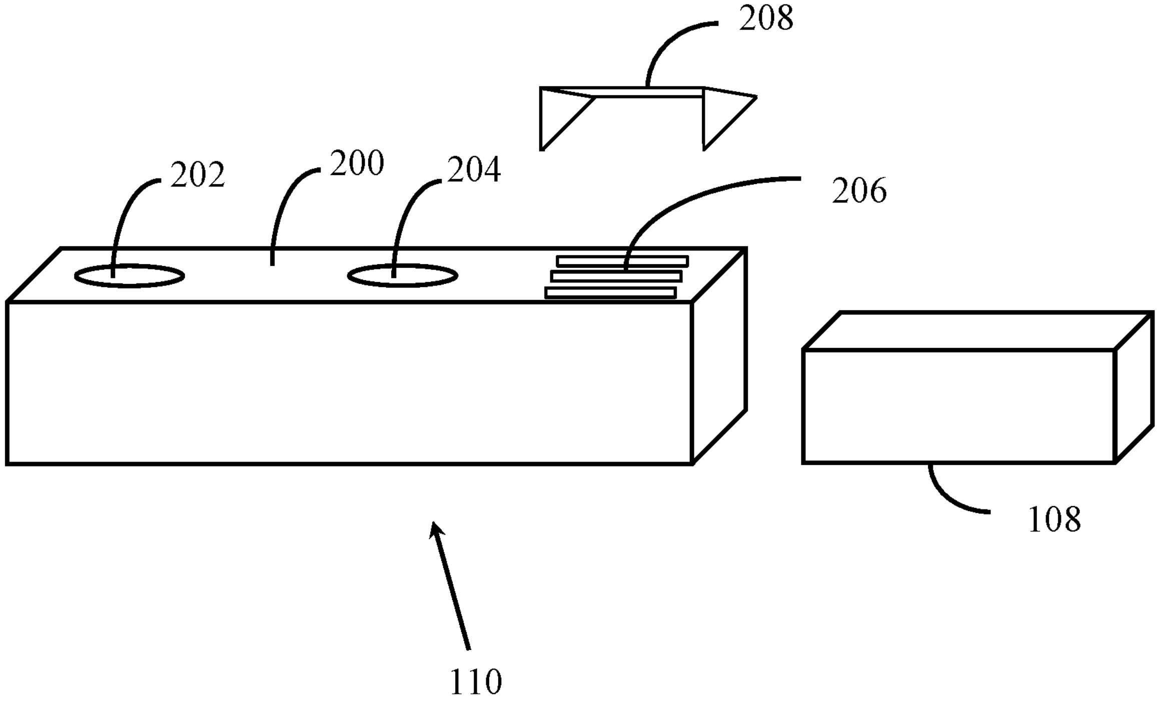
FIG. 2 is a perspective view of one embodiment of a barrier sensor shown in FIG. 1.

At least one of barrier sensors 104 and 106 is configured to detect when someone is in proximity to a barrier inside the premises when a barrier is opened or closed. For example, FIG. 2 illustrates barrier sensor 104 in a perspective view, comprising magnet 108 and reed switch assembly 110. In other embodiments, the barrier sensor may use alternative door/window status detection devices, such as a hall-effect device, an ultrasonic transducer/receiver, an infrared transmitter/receiver, or some other device to determine when a window is has been open, closed or moved from an open position. The barrier sensor may have additional features, such as a user interface 202 and status indication 204. The user interface 202 may comprise a pushbutton or other switch to provide input to the barrier sensor. For example, in some embodiments, user interface 202 is used to place the barrier sensor into a "learn" state of operation for initial installation and pairing with receiver 116 or remote server 126. In another embodiment, user interface 202 may allow a user to temporarily disarm the barrier sensor in order to open a barrier without triggering an escalated alarm response from receiver 116/remote server 126. However, user interface 202 may not be needed or desirable to manually bypass barrier sensor 104 as barrier sensor 104 can sense when someone is inside a premises and in proximity to a barrier being monitored, so that if the window is opened by such a person, barrier sensor 104 is automatically bypassed, i.e., it will not trigger an escalated alarm response when the barrier is opened. Status indicator 204 can comprise, for example, an LED to indicate when the barrier sensor is disarmed or operating normally.

In the embodiment shown in FIG. 2, reed switch assembly 110 comprises housing 200 that covers a processor, a barrier state detection device (in this example, a reed switch), an RF transmitter, a human detection device, a movement detector and a battery. For purposes of discussion herein, the term "barrier sensor" is used interchangeably with the term "reed switch assembly" or the combination of reed switch assembly 110 and magnet 108. Of course, the barrier sensor could comprise any number of alternative embodiments, such as a magnet-less door window sensor, an RF detector, an RFID sensor, a light interruption detector, or any other device that is able to determine the status of a barrier such as a door or a window (i.e., whether a door or window is open or closed). The reed switch is used to detect the presence or absence of a magnetic field produced by magnet 108 and the transmitter used to transmit information to receiver 116/remote server 126 relating to the status of a monitored door or window. The human detection device detects the presence of a person in proximity to the barrier or barrier sensor inside the premises. The term "in proximity" generally means within a distance for a human being to open or close the barrier.

In one embodiment, as explained above, a barrier sensor is configured to detect human beings inside a monitored premises and in proximity to a barrier. In another embodiment, the barrier sensor is configured to detect human beings outside a monitored premises and in proximity to a barrier. When configured to detect human beings outside of a monitored premises, the barrier sensor may use a detector that is external to housing 200 and coupled to the detector via a wire or via wireless communications. For example, an ultrasonic transducer and receiver could be mounted external to a window, and a wire connecting it to the barrier sensor.

Barrier sensor 104 as shown in FIG. 2 may comprise one or more apertures 206 to allow a human detection device inside housing 200 to propagate signals in order to detect a human being in proximity to a barrier. For example, if the human detection device is an ultrasonic transducer and receiver, the apertures 206 allow ultrasonic pings to escape the housing and to be returned to the ultrasonic receiver for processing. In other embodiments, the apertures 206 may, additionally or alternatively, be located on a different surface of housing 200 in order to better direct signals used to determine the presence of a human being. For example, in the embodiment shown in FIG. 2, apertures 206 are located on "front-facing" side of housing 200. This configuration might be best for a barrier sensor that is mounted between three and a half to six feet from the floor, for example, such as on a "head" of a movable portion of a double hung window, to project signals horizontally towards anyone who might be in proximity to the window. In an embodiment where the barrier sensor is mounted between seven and ten feet, for example mounted to a top portion of a door, apertures 206 might be formed on the "bottom-facing" surface of housing 200, in order to project signals downwards, towards a human being who may be opening the door.

In some embodiments, a deflection device 208 may be used to better guide signals emanating from housing 200 to detect a human being after being installed over apertures 206. In one embodiment, deflection device 208 comprises a fixed structure that mounts over apertures 206. In another embodiment, deflection device 208 comprise movable "shutters" or "louvers" mounted over or through apertures 206 to allow a user to adjust the direction of signals emanating from housing 200. The deflection device 208 may be configured to guide signals at a certain angle away from the housing 200 to have the best opportunity to sense a human being, e.g., to guide signals to where a human being would expect to be when the reed switch assembly is mounted in a typical location, such as on top of a door or window frame. For example, the angle of deflection device 208 may be 45 degrees, thereby guiding signals downwards and away from the barrier by 1-2 feet or so, depending on how high the reed switch assembly is mounted.

In one embodiment, when a person is detected near a barrier monitored by barrier sensor 104 and inside a monitored premises, barrier sensor 104 may not trigger an escalated alarm response when the barrier is opened and, conversely, if a person is not detected inside the monitored premises in proximity to the barrier when the barrier is opened, an escalated alarm response is initiated by receiver 116 or remote server 126. This reduces the occurrence of false alarms, because a person opening a door or window from within a monitored premise is assumed to have authorization to be there. In another embodiment, the human detection device is configured to detect the presence of a person near the barrier sensor, but outside the monitored premises. In this case, an escalated alarm response is triggered only when a barrier is opened and a person is detected near barrier sensor 104, outside the monitored premises and, conversely, when the barrier is opened and no person is detected outside the premises, no escalated alarm response is generated.

In some embodiments, barrier sensor 104 is disabled when it detects a barrier being opened or moved by someone inside a premises by failing to transmit an alarm signal to receiver 116 or remote server 126. In another embodiment, when a barrier is opened by someone inside the premises, a bypass signal is transmitted to receiver 116 or remote server 126, instructing receiver 116 or remote server 126 not to cause an escalated alarm response if receiver 116 or remote server 126 receives an alarm signal after transmission of the bypass signal. The bypass signal is an instruction to receiver 116 or remote server 126 to ignore future alarm signals generated by a particular barrier sensor until a bypass cancellation signal is received from the barrier sensor. In yet another embodiment, barrier sensor 104 transmits one or more signals when it detects that a barrier has been opened or moved and a person is, or is not, inside a premises in proximity to a barrier. In this embodiment, barrier alarm 104 transmits an indication of whether a barrier was opened or moved, and an indication of whether the barrier was opened or moved by a person inside a premises and in proximity to the barrier near the time when the barrier was opened or moved. This allows receiver 116 or remote server 126 to make a decision whether to cause an escalated security response based on the alarm signals from barrier sensor 104.

Figure 3:
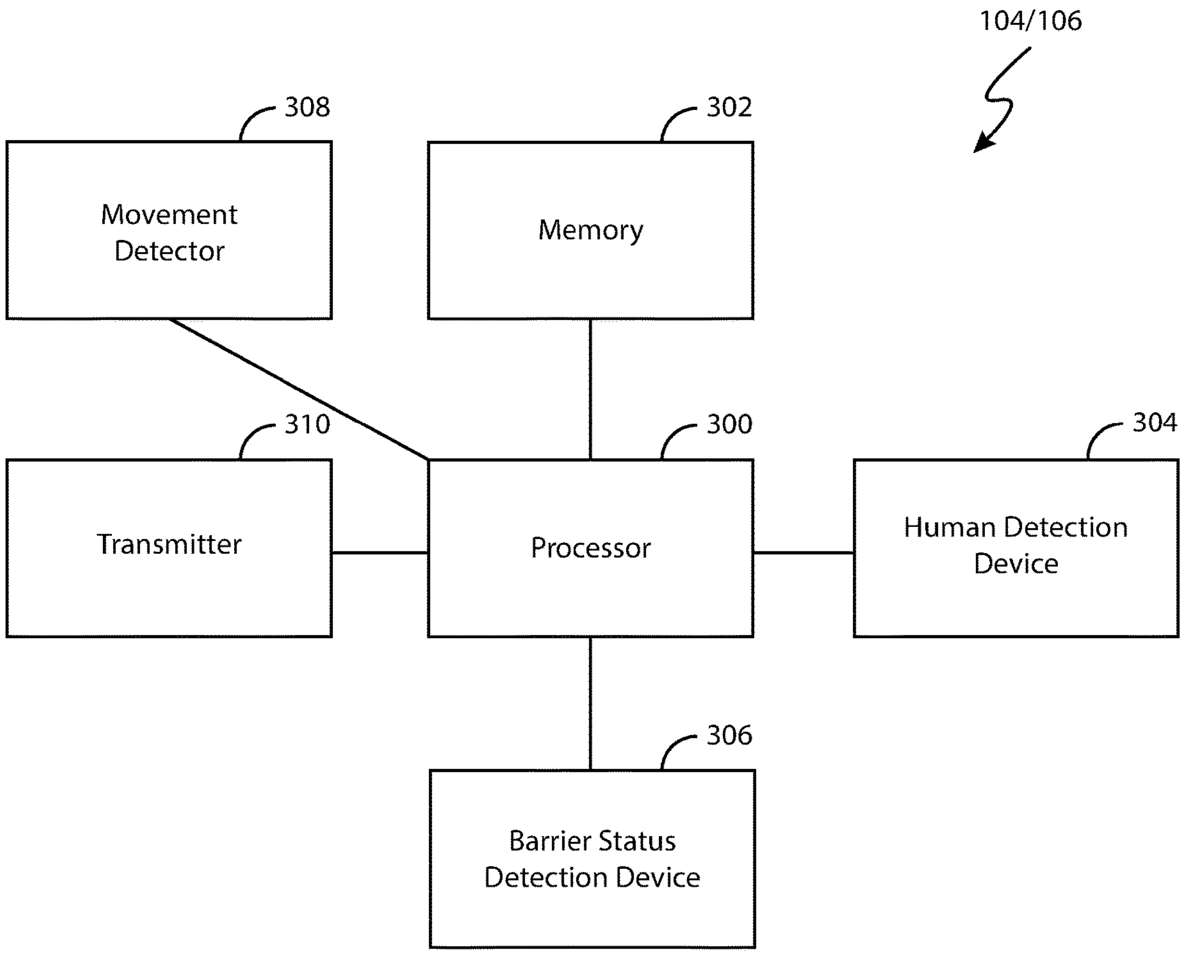
FIG. 3 is a functional block diagram of one embodiment of a barrier sensor shown in FIG. 2.

FIG. 3 is a functional block diagram of one embodiment of barrier sensor 104 (or 106) in accordance with the teachings herein. Specifically, FIG. 3 shows a processor 300, memory 302, a human detection device 304, a barrier status detection device 306, and transmitter 308. It should be understood that the functional blocks may be coupled to one another in a variety of ways, and that not all functional blocks necessary for operation of the barrier sensor are shown (such as a power supply), for purposes of clarity.

Processor 300 is configured to provide general operation of barrier sensor 104 by executing processor-executable instructions stored in memory 302, for example, executable code. Processor 300 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively. Due to the relatively small size of barrier sensor 104, and the fact that barrier sensor 104 is generally battery-powered, processor 300 is typically selected based on power consumption, size, and cost.

Memory 302 is coupled to processor 300, comprising one or more non-transitory information storage devices, such as one or more static or dynamic memory devices, such as RAM, ROM, flash, or some other combination of electronic, optical, or mechanical memory devices. Memory 302 is used to store processor-executable instructions for operation of barrier sensor 104 as well as any information used by processor 300, such as threshold information, parameter information, identification information, current or previous door or window status information, etc. It should be understood that in some embodiments, at least a portion of memory 302 is physically integrated with processor 300.

Human detection device 304 is coupled to processor 300, comprising a device or circuitry to detect the presence of a person in proximity to a barrier, either inside a monitored premises, outside a monitored premises, or both. Examples of human detection device 304 include an ultrasonic transducer/receiver, an infrared transmitter/receiver, a capacitance sensor, an RF tank circuit, an RFID receiver and RFID chip, a motion detector, a time-of-flight sensor, or some other circuitry or device able to detect the presence of a human being proximate to a barrier. The term "proximate to a barrier" means that a person is within a distance from a barrier that the person could open the barrier.

Barrier status detection device 306 is coupled to processor 300 and monitors or determines a state, physical condition, attribute, status, or parameter of a barrier being monitored, such as the status (e.g., "open", "closed", "moved") of a door, window, gate, or other entrance or exit barrier. Barrier status detection device 306 may comprise a reed switch, ultrasonic transducer/receiver, an infrared transmitter/receiver, an RFID receiver, a tilt sensor, or some other device to determine whether a window is open or closed.

Movement detector 308 is coupled to processor 300 and monitors a barrier for movement after the barrier has been placed into an open position. Movement detector 308 could, alternatively or in conjunction with barrier status detection device 306, to determine when a barrier has been opened and/or closed. Movement detector 308 may comprise comprises a MEMS accelerometer, such as an ADXL345 manufactured by Analog Devices, of Norwood, Massachusetts. In another embodiment, movement detector 308 comprises a gyroscope, such as the LPY530AL analog gyroscope manufactured by STmicroelectronics of Geneva, Switzerland. In another embodiment, both an accelerometer and a gyroscope are used together, acting as motion detector 308. Generally, both of these devices are capable of generating electrical signals that represent an acceleration, a velocity, an angular velocity and/or a position relating to an object to which they are mounted. In another embodiment, one or more of these attributes is determined mathematically using one of the other attributes. For example, a position of a barrier may be determined by twice integrating an acceleration signal from motion detector 308 by processor 300.

Transmitter 310 comprises circuitry necessary to wirelessly transmit alarm signals and/or status messages and/or other information from a specialized barrier sensor to one or more receivers, such as a central security panel or a gateway device coupled to a wide area network such as the Internet, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, transmitter 310 comprises well-known circuitry to provide signals to central security panel or a gateway via wiring, such as telephone wiring, twisted pair, two-conductor pair, CAT wiring, AC home wiring, or other type of wiring.

Figure 4A:
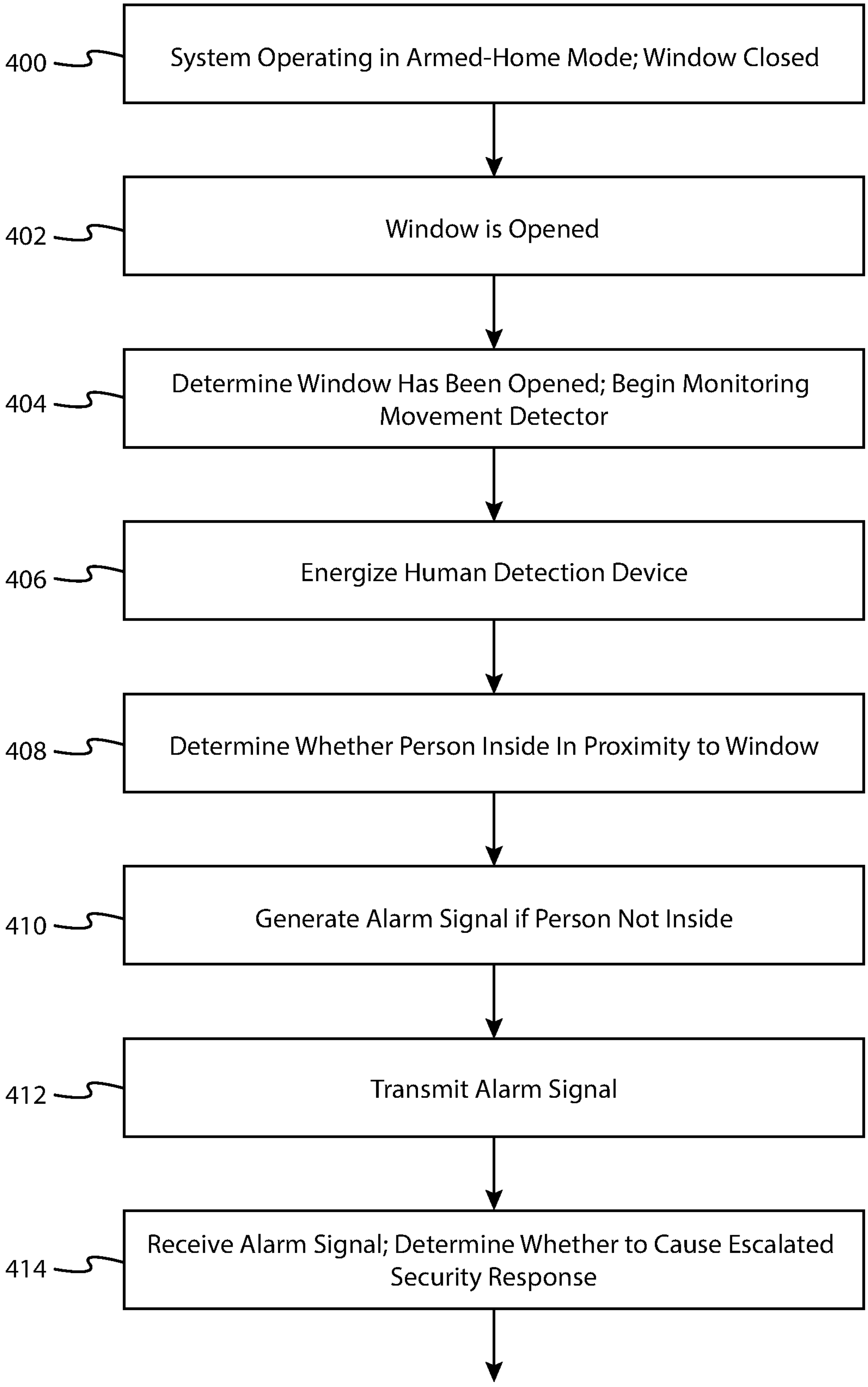
FIGS. 4A-4C represent a flow diagram illustrating one embodiment of a method performed by a specialized barrier sensor monitoring a barrier in a premises, for allowing someone inside to open a door or window without triggering an escalated alarm response, for leaving a door or window open while it is being actively monitored by receiver 116 or remote server 126, and to cause an escalated alarm response if the receiver 116 or remote server 126 is operating in an armed-home mode and a door or window monitored by the specialized barrier sensor is moved from the open position by a person not inside the premises.
Figure 4B:
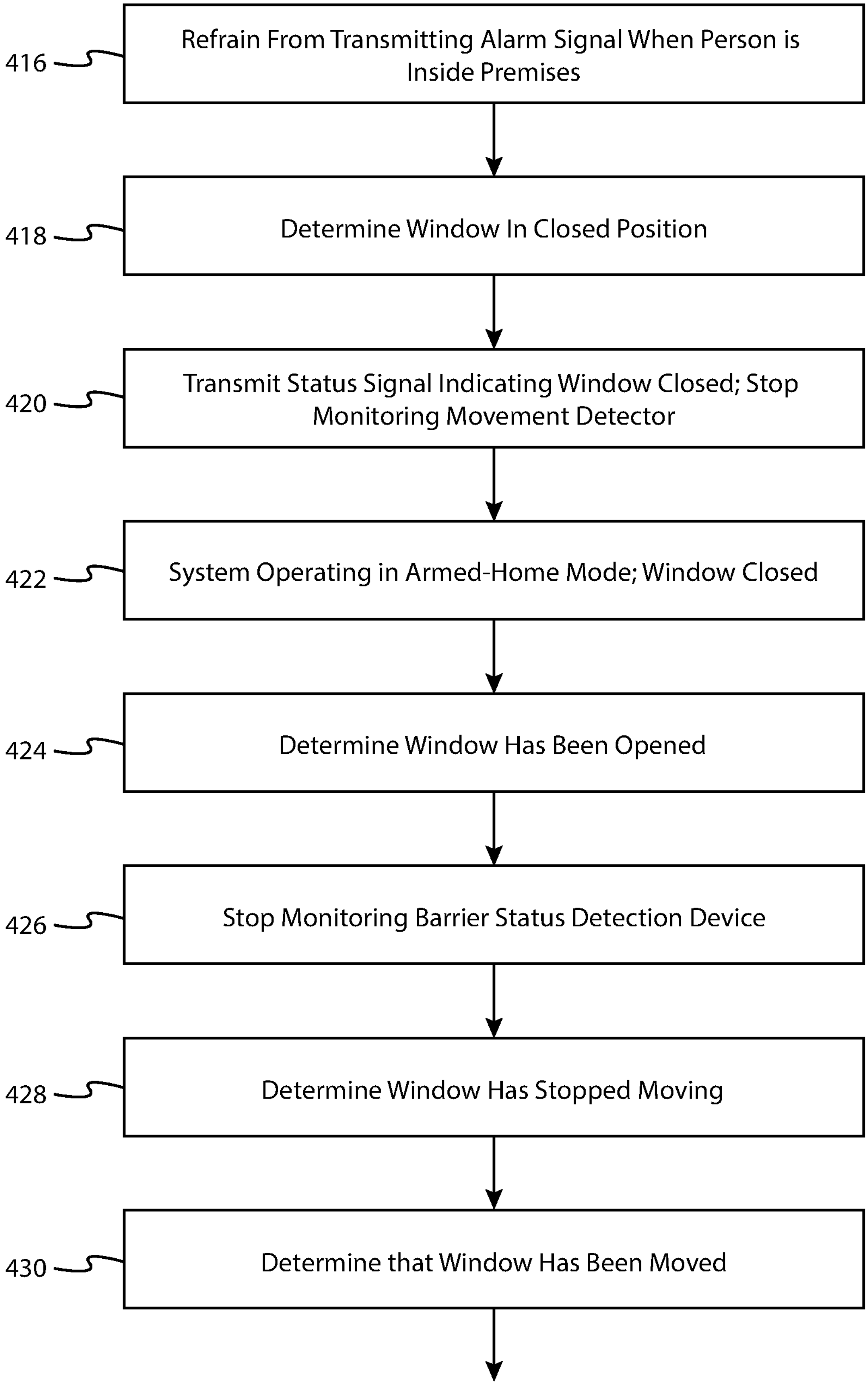
Figure 4C:
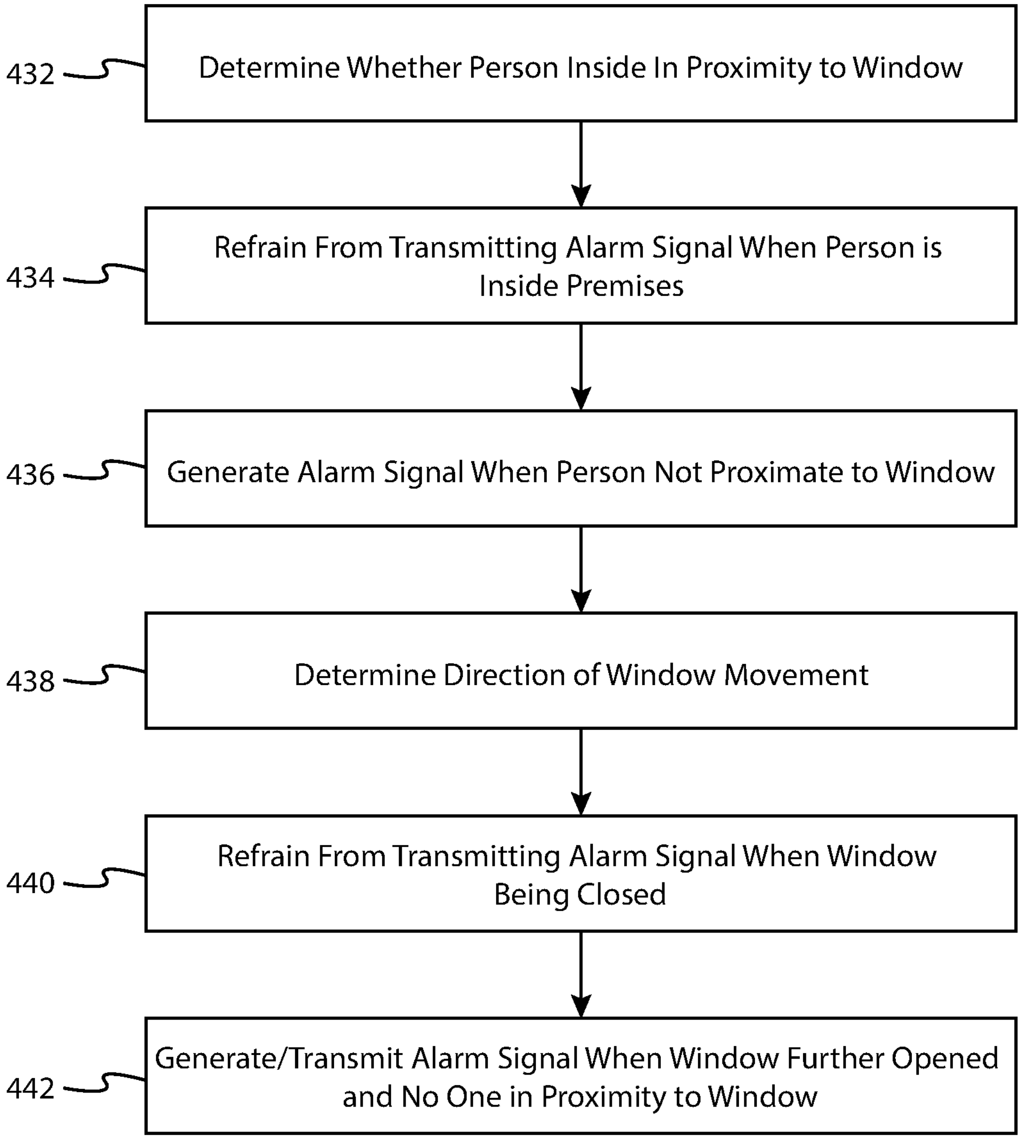

FIG. 4 is a flow diagram illustrating one embodiment of a method performed by barrier sensor 104 monitoring a barrier in a premises, for allowing someone inside to open a door or window without triggering an escalated alarm response, for leaving a door or window open while it is being actively monitored by receiver 116 or remote server 126, and to cause an escalated alarm response if the receiver 116 or remote server 126 is operating in an armed-home mode and a door or window monitored by barrier sensor 104 is moved from an open position by a person outside the premises. It should be understood that in some embodiments, not all of the steps shown in FIG. 4 are performed. It should also be understood that the order in which the steps are carried out may be different in other embodiments.

In the following discussion, it is assumed that barrier sensor 104 comprising a reed switch assembly and a magnet mounted to window 102. It should be understood that the concepts discussed below may be equally applicable to other uses of barrier sensor 104, such as use as a door sensor monitoring door 100.

At block 400, receiver 116 or remote server 126 is operating in an armed-home mode of operation. Processor 300 monitors signals from barrier status detection device 306 to determine when window 102 has been opened. In one embodiment, processor does not monitor movement detector 308 when window 102 is shut. In another embodiment, processor 300 monitors both barrier status detection device 306 and movement detector 308 to determine when window 102 has been opened, typically by determining when the barrier status detection device 306 indicates that window 102 has been opened, i.e., a change in state of the reed switch is detected and movement detector 308 indicates that window 102 is experiencing some degree of acceleration from movement of window 102 from the closed position.

At block 402, window 102 is opened.

At block 404, processor 300 determines that window 102 has been opened by detecting a change in a signal from barrier status detection device 306, in this case, that the reed switch has changed state. In another embodiment, where processor 300 monitors both barrier status detection device 306 and movement detector 308 to determine when window 102 has been opened, processor 300 determines that window 102 has been opened when it determines that the barrier status detection device 306 indicates that window 102 has been opened and movement detector 308 indicates that window 102 is experiencing some degree of acceleration from movement of window 102 from the closed position.

At block 406, in one embodiment, in response to determining that window 102 has been opened, processor 300 energizes person human detection device 304 from a de-energized, quiescent or low-power state of operation. In this embodiment, human detection device 304 is kept in a default, quiescent, de-energized or low-power state and energized only when processor 300 determines that window 102 has been opened. The quiescent state refers to a low-power consumption state of operation or a no-power consumption state of operation, e.g., being in an "off" condition. In this way, power savings are achieved by barrier sensor 104, as the circuitry comprising human detection device 304 is only energized when window 102 is opened. For example, in an embodiment where human detection device 304 comprises an ultrasonic transducer and an ultrasonic receiver, the ultrasonic transducer and ultrasonic receiver may be powered off until processor 300 determines that window 102 has been opened. In response to determining that window 102 has been opened, processor 300 energizes the ultrasonic transducer and an ultrasonic receiver circuitry and causes the ultrasonic transducer to emit a number of ultrasonic "pings" in order to determine whether a human being is in proximity to window 102 or not. In one embodiment, only a single ping is sent. Processor 300 then determines whether a human being is in proximity of window 102 inside the premises by determining if a return signal was received by the ultrasonic receiver. If no human being was determined to be in proximity of window 102, it indicates that window 102 was opened by someone outside the premises, e.g., an unauthorized person. In this case processing continues to block 408. If processor 300 determined that a human being was in proximity of window 102 inside the premises, then no alarm signal would be transmitted to receiver 116 or remote server 126, as this is an indication that someone inside the premises opened window 102, e.g., an authorized person, or a bypass signal is transmitted to receiver 116 or remote server 126.

In another embodiment, human detection device 304 periodically evaluates the space inside the premises in proximity to window 102 to determine whether a human being is present or not. For example, a motion sensor may be energized once every three seconds to determine whether any infrared return signals are detected, indicating the presence of a human being. In another embodiment, an ultrasonic transducer may transmit an ultrasonic "ping" once every two seconds to determine whether a return signal is received, indicating the presence of a human being.

In one embodiment, in response to determining that window 102 has been opened, processor 300 begins monitoring movement detector 308 in an embodiment where processor 300 does not monitor movement detector 308 when window 102 is closed.

At block 408, processor 300 determines whether a person is inside the premises in proximity to window 102 by evaluating one or more signals from human detection device 304.

At block 410, in response to determining that window 102 has been opened and that a human being is not inside the premises in proximity to window 102, processor 300 generates an alarm signal and provides it to transmitter 310. In another embodiment, processor 300 causes transmitter 310 to transmit an indication of the status of window 102, i.e., open, closed, moved and an indication of whether someone was detected inside the premises in proximity to window 102 or not.

At block 412, transmitter 310 transmits the alarm signal to receiver 116. Alternatively, or in addition, transmitter 310 transmits the alarm signal to remote server 126 via receiver 116 and wide-area network 122.

At block 414, in one embodiment, receiver 116 receives the alarm signal from the barrier sensor and processes it to determine if it should cause an escalated alarm response to occur. For example, upon determining that the receiver 116 is operating in an armed-home mode of operation and an alarm signal is received from barrier sensor 104, receiver 116 may initiate the escalated alarm response by causing a loud siren inside the premises to activate and/or send a notification to remote monitoring center 124 so that remote monitoring center 124 may summon appropriate authorities to the premises. Receiver 116 may also provide a notification to interested parties via text message, email or a phone call that an alarm signal was received while receiver 116 was in an armed-home mode of operation.

In another embodiment where barrier sensor 104 transmits a window status indication and a person status indication, receiver 116 or remote server 126 determines whether to cause an escalated alarm response to occur based on the two indications of window status and person status. Thus, if receiver 116 or remote server 126 determines that window 102 has been opened, or moved, and that a person was not inside the premises in proximity to window 102, and receiver 116 or remote server 126 is operating in an armed-home mode of operation, receiver 116 or remote server 126 will cause an escalated alarm response to occur. Conversely, if receiver 116 or remote server 126 determines that window 102 has been opened, or moved, and that a person was inside the premises in proximity to window 102, and receiver 116 or remote server 126 is operating in an armed-home mode of operation, receiver 116 or remote server 126 will not cause an escalated alarm response to occur.

At block 416, if a person is detected inside the premises in proximity to window 102, per block 408, processor 300 refrains from transmitting an alarm signal to receiver 116 or remote server 126. In another embodiment, processor 300 causes transmitter 310 to transmit a window status indication (in this case "open") and a person status indication (in this case "present") when a person is detected inside the premises in proximity to window 102. This allows receiver 116 or 126 to decide whether to cause an escalated alarm response based on the two indications.

At block 418, at some later time, processor 300 determines that window 102 has been placed into a closed position based on signals received from barrier status detection device 306, movement detector 308, or both.

At block 420, in response to determining that window 102 has been placed into the closed position, processor 300 may cause transmitter 310 to transmit a status signal to receiver 116 or remote server 126 indicating that window 102 is in the closed position. In addition, in response to determining that window 102 has been placed into the closed position, in some embodiments, processor 300 stops monitoring movement sensor 308, and/or places human detection device 304 into a de-energized or quiescent state.

At block 422, after window 102 has been closed, receiver 116 or remote server 126 continues to operate in an armed-home mode of operation. Processor 300 monitors signals from barrier status detection device 306 to determine when window 102 is opened again. In one embodiment, processor 300 does not monitor movement detector 308 when window 102 is shut. In another embodiment, processor 300 monitors both barrier status detection device 306 and movement detector 308 to determine when window 102 has been re-opened, typically by determining when the barrier status detection device 306 indicates that window 102 has been opened, i.e., a change in state of the reed switch is detected and movement detector 308 indicates that window 102 is experiencing some degree of acceleration from movement of window 102 from the closed position.

At block 424, processor 300 determines that window 102 has been opened by a person inside the premises in proximity to window 102, for example, to allow outside air to flow into the premises through window 102, as discussed above. As a result, no escalated alarm response is initiated. Window 102 is now in an open position, for example, open 6 inches.

At block 426, processor 300 may, in one embodiment, stop monitoring barrier status detection device 306 after it determines that window 102 has been opened, in order to save power or to simplify further determinations about the status of window 102.

At block 428, processor 300 receives signals from motion detector 308 indicating movement of window 102 as window 102 is being opened, then indicate that window 102 has stopped moving. Processor 300 may determine that window 102 is open a desired amount when the indications from movement detector 308 indicate that window 102 has stopped moving for more than a predetermined amount of time, such as between 1 and 10 seconds, for example.

At block 430, at some time later, processor 300 determines that window 102 has been moved from the open position, either in a direction further opening window 102 or in a direction towards closing window 102. Processor 300 determines this by examining signals from motion detector 308, which provides indications of window movement via window acceleration, velocity, or position.

At block 432, processor 300 determines whether a person is inside the premises in proximity to window 102, as explained above. In one embodiment where human detection device 304 is held in a normally-quiescent state, processor 300 first energizes human detection device 304 so that human detection device 304 can determine whether a person is inside the premises in proximity to window 102 near the time when window 102 is opened.

At block 434, if processor 300 determines that a person is inside the premises in proximity to window 102 near the time that window 102 is moved from the open position, i.e., within a few seconds before or after movement of window 102 is detected) processor 300 refrains from sending an alarm signal to receiver 116 or remote server 126, as described earlier above, and continues to monitor movement detector 308 for further movement of window 102. Processor 300 may, alternatively, determine that window 102 has been shut, for example when movement detector 308 indicates a sudden deceleration of window 102 as it is shut. In this case, processor 300 may stop monitoring movement detector 308 and begin monitoring barrier status detection device 306 in an embodiment where processor 300 monitors only barrier status detection device 306 while window 102 is closed and movement detector 308 while window 102 is open. In another embodiment, upon determining that a person is inside the premises in proximity to window 102 near the time that window 102 was moved, processor 300 transmits a window status signal and a person status signal to receiver 116 or remote server 126 for receiver 116 or remote server to determine whether to initiate an escalated alarm response.

At block 436, if processor 300 determines that a person is not inside the premises in proximity to window 102 near the time that window 102 is moved from the open position, indicating that window 102 was moved by an unauthorized person outside the premises, processor 300 generates an alarm signal and transmits the alarm signal to receiver 116 or remote server 126 for processing, i.e., for receiver 116 or remote server 126 to cause an escalated alarm response if security system 130 is in an armed-home mode of operation. In another embodiment, upon determining that a person is not inside the premises in proximity to window 102 near the time that window 102 was moved, processor 300 transmits a window status signal and a person status signal to receiver 116 or remote server 126 for receiver 116 or remote server to determine whether to initiate an escalated alarm response.

At block 438, in an embodiment where processor 300 is able to distinguish directionality of window 102 while it is being moved from the open position, i.e., further opened or less open, processor determines a direction of movement.

At block 440, in this embodiment, processor 300 refrains from transmitting an alarm signal to receiver 116 or remote server 126 if processor 300 has determined that window 102 is being moved towards a closed position, i.e., someone is moving window 102 to a more-closed position than when window 102 was in the open position. In one embodiment, processor 300 need not determine whether someone is inside the premises in proximity to window 102—any time window 102 is being moved towards a more-closed position may indicate that no one is trying to enter the premises through window 102. In another embodiment, upon determining that window 102 is being moved towards a closed position, processor 300 transmits a window status signal indicating that window 102 is being moved towards a closed position and in some embodiments, a person status signal to receiver 116 or remote server 126, indicating that a person is inside the premises and in proximity to window 102, for receiver 116 or remote server to determine whether to initiate an escalated alarm response.

At block 442, in this embodiment, processor 300 generates and transmits an alarm signal if window 102 is being further opened from the open position when processor 300 determines that no one is inside the premises in proximity to window 102. This indicates that that window 102 is being opened further from the open position by someone outside of the premises who is likely not authorized to be inside the premises. In another embodiment, upon determining that a person is not inside the premises in proximity to window 102 near the time that window 102 was further opened, processor 300 transmits a window status signal indicating that window 102 is being opened and a person status signal indicating that a person is not inside the premises in proximity to window 102 to receiver 116 or remote server 126 for receiver 116 or remote server to determine whether to initiate an escalated alarm response.

Figure 5:
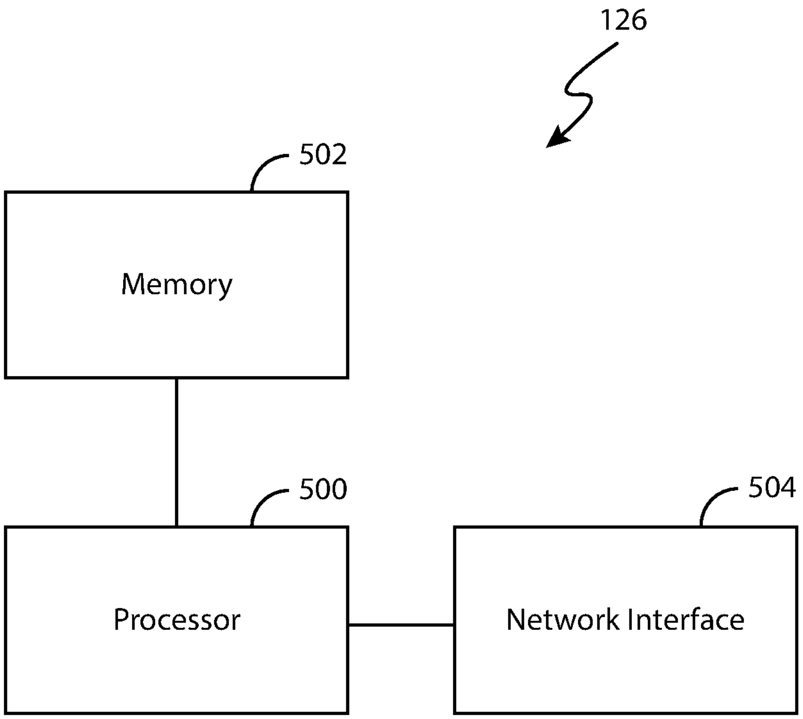
FIG. 5 is a functional block diagram of one embodiment of the remote server shown in FIG. 1, used in an embodiment where the remote server determines whether escalated alarm responses should be initiated upon receipt of alarm signals from one or more barrier sensors as shown in FIGS. 1-3.

FIG. 5 is a functional block diagram of one embodiment of remote server 126 used in an embodiment where remote server 126 determines whether escalated alarm responses should be initiated upon receipt of alarm signals from one or more barrier sensors in security system 130. Specifically, FIG. 5 shows processor 500, memory 502, and network interface 504. It should be understood that the functional blocks may be coupled to one another in a variety of ways, and that not all functional blocks necessary for operation of the barrier sensor are shown (such as a power supply), for purposes of clarity.

Processor 500 is configured to provide general operation of remote server 126 by executing processor-executable instructions stored in memory 502, for example, executable code. Processor 500 typically comprises one or more general purpose processors, such as a Pentium®-class microprocessor manufactured by Intel Corporation of Santa Clara, California, although other types of processors, such as one or more of a variety of microprocessors, microcomputers, and/or microcontrollers may be used alternatively. Processor 500 is typically selected based on its computational power and cost considerations.

Memory 502 is coupled to processor 500, comprising one or more non-transitory information storage devices, such as one or more static or dynamic memory devices, such as RAM, ROM, flash, or some other combination of electronic, optical, or mechanical memory devices. Memory 502 is used to store processor-executable instructions for operation of remote server 126 as well as any information used by remote server 126, such as threshold information, parameter information, identification information, current or previous door or window status information, etc. It should be understood that in some embodiments, at least a portion of memory 502 is physically integrated with processor 500.

Network interface 504 is coupled to processor 500, comprising well-known circuitry for allowing remote server 126 to communicate with barrier sensors in a security systems via wide-area network 122 using, for example, IP-based protocols.

Figure 6A:
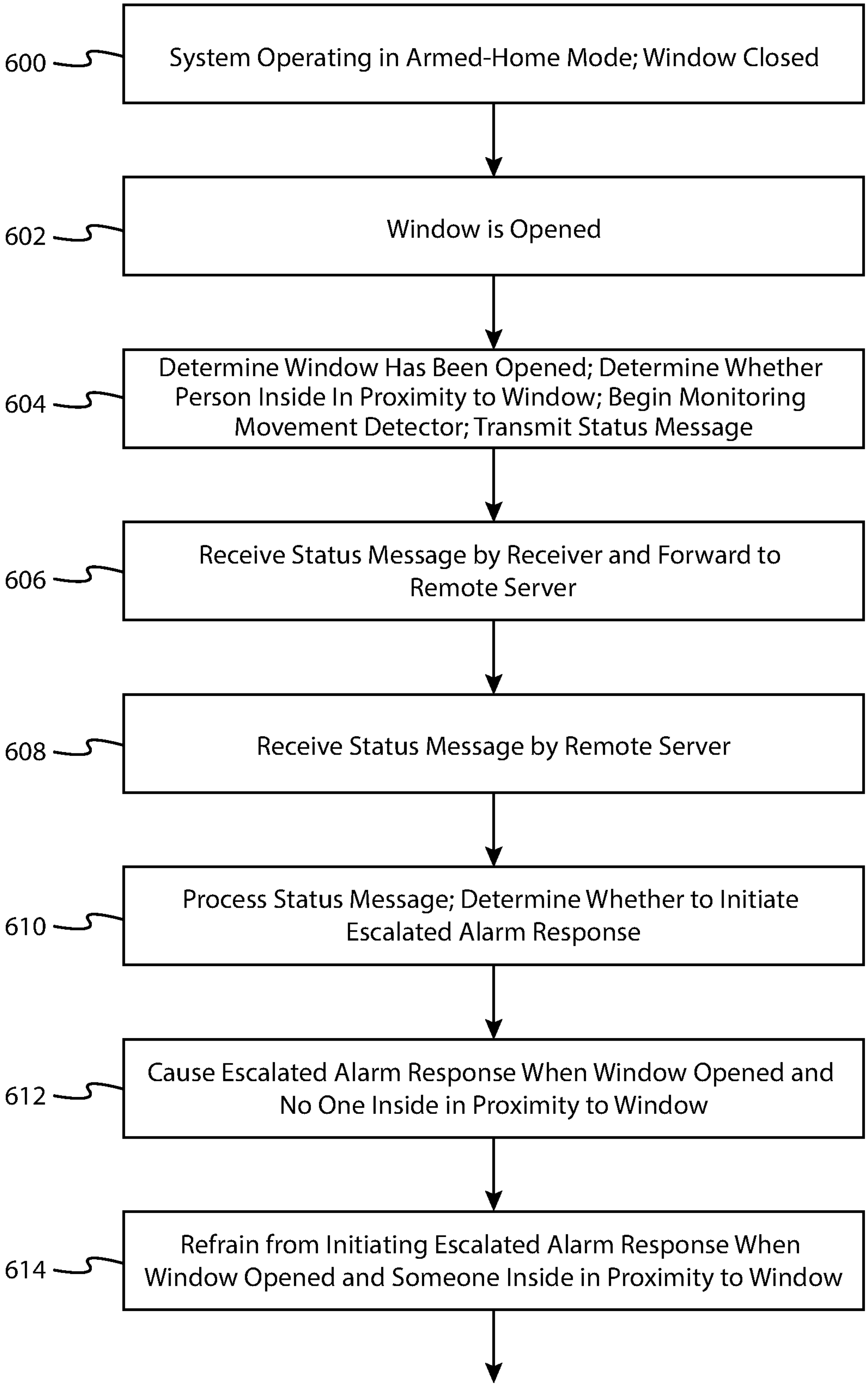
FIGS. 6A-6C represent a flow diagram illustrating one embodiment of a method performed by the remote server as shown in FIGS. 1 and 5, for allowing someone inside a premises monitored by the security system as shown in FIG. 1 to open a door or window without triggering an escalated alarm response, for leaving a door or window open while it is being actively monitored, and to cause an escalated alarm response if the security system is operating in an armed-home mode and a door or window monitored by a barrier sensor is moved from the open position by a person not inside the premises.
Figure 6B:
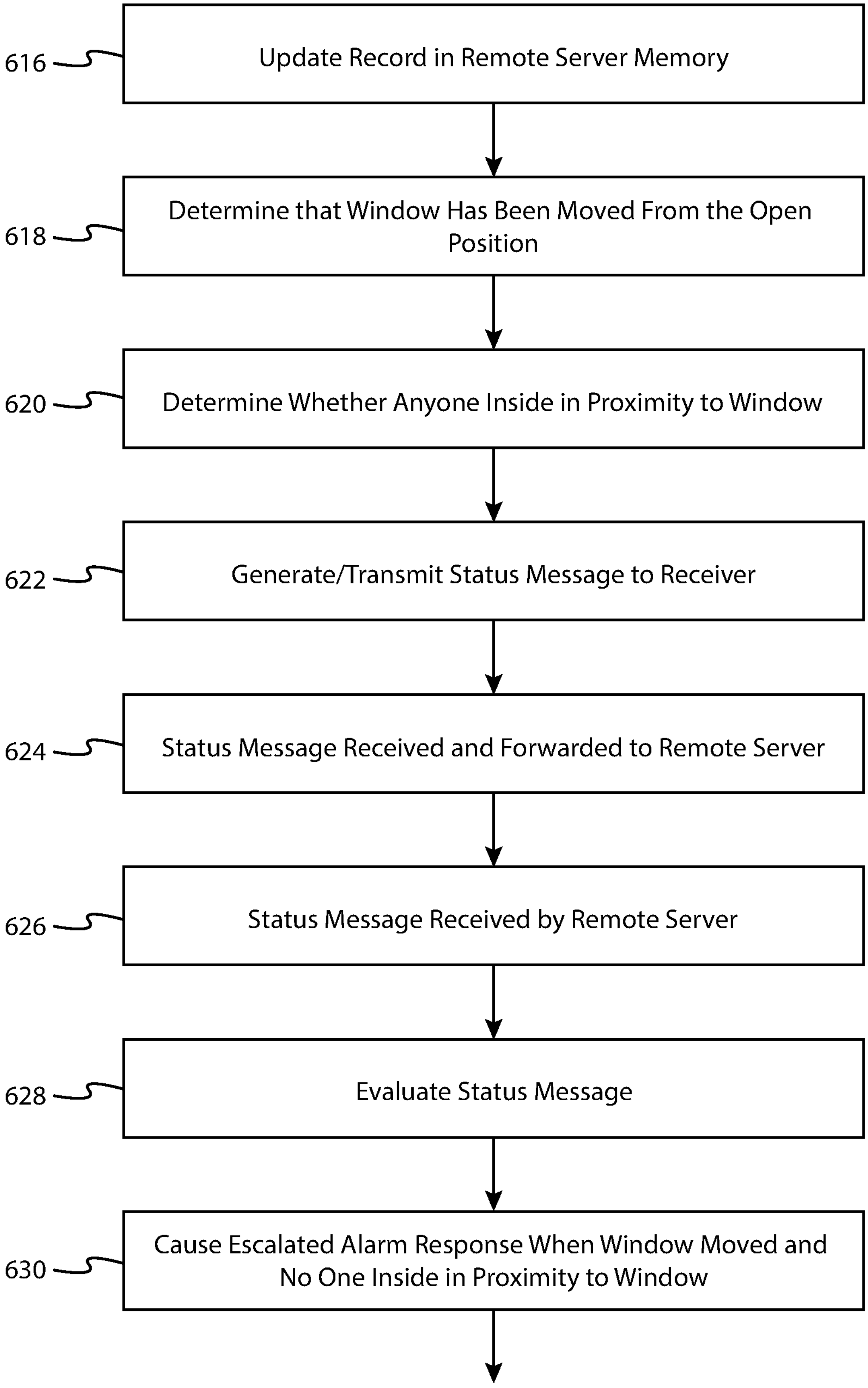
Figure 6C:
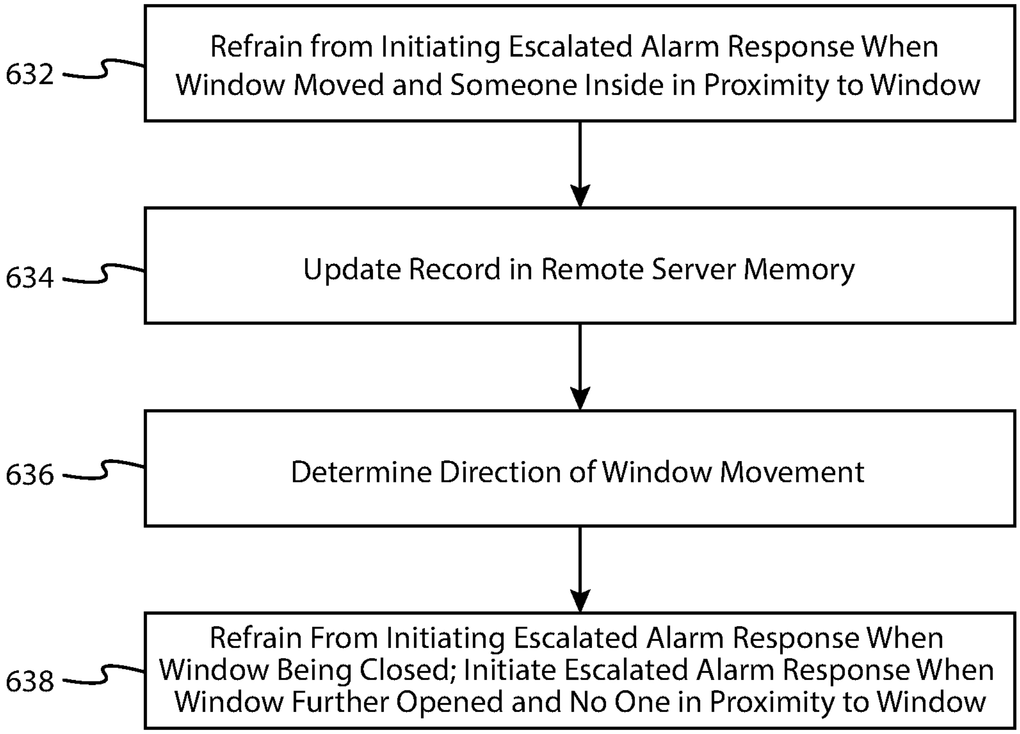

FIG. 6 is a flow diagram illustrating one embodiment of a method performed by remote server 126 for allowing someone inside a premises monitored by remote server 126 to open a door or window without triggering an escalated alarm response, for leaving a door or window open while it is being actively monitored, and to cause an escalated alarm response if the security system is operating in an armed-home mode and a door or window monitored by a barrier sensor is moved from the open position by a person not inside the premises. It should be understood that in some embodiments, not all of the steps shown in FIG. 6 are performed. It should also be understood that the order in which the steps are carried out may be different in other embodiments.

In the following discussion, it is assumed that barrier sensor 104 is monitoring window 102. It should be understood that the concepts discussed below may be equally applicable to other uses of barrier sensor 104, such as use as a door sensor monitoring door 100.

At block 600, remote server 126 is operating in an armed-home mode of operation, in communication with barrier sensor 104 via receiver 116 and wide-area network 122. Window 102 is closed.

At block 602, window 102 is opened.

At block 604, barrier sensor 104 determines that window 102 was opened and whether someone was inside the premises in proximity to window 102 near the time that window 102 was opened or not. In response, barrier sensor 104 sends a status message to receiver 116, indicating that window 102 was opened and whether someone was inside the premises in proximity to window 102 near the time that window 102 was opened, or not. In one embodiment, processor 300 begins monitoring movement detector 308. In another embodiment, processor 300 begins monitoring movement detector 308 and stops monitoring barrier status detection device 306.

At block 606, receiver 116 receives the status message and forwards it to remote server 126 via wide-area network 122.

At block 608, the status message is received by processor 500 of remote server 126 via network interface 504.

At block 610, processor 500 evaluates the status message and processes it to determine if it should cause an escalated alarm response to occur. For example, processor 500 evaluates the status message to determine if the status message indicates that window 102 has been opened and whether there was someone inside the premises and in proximity to window 102 near the time that window 102 was opened while security system 130 is in an armed-home mode of operation.

At block 612, when processor 500 determines that the status message indicates that window 102 has been opened and that there is no one inside the premises and in proximity to window 102 near the time that window 102 was opened while security system 130 is in an armed-home mode of operation, processor 500 causes an escalated alarm response to occur. Generally, processor 500 sends one or more instructions to receiver 116 via network interface 504 and wide-area network 122, instructing receiver 116 to cause, for example, a loud siren to sound inside the premises and/or to flash one or more strobe lights. Processor 500 may also, as part of the escalated alarm response, contact remote monitoring center 124 to alert remote monitoring center 124 of a potential break in at the premises. Processor 500 may also, as part of the escalated alarm response, send a notification to one or more interested parties via text message, email or a phone call via network interface 504 and wide-area network 122 that a potential break in at the premises has occurred.

At block 614, when processor 500 determines that the status message indicates that window 102 has been opened and that there is someone inside the premises and in proximity to window 102 near the time that window 102 was opened while security system 130 is in an armed-home mode of operation, processor 500 refrains from causing an escalated alarm response from occurring.

At block 616, processor 500 may update a record stored in memory 502, indicating that window 102 was opened by an authorized person, along with a date and a time that the opening occurred.

At block 618, after window 102 has been opened and no escalated alarm response was executed, barrier sensor 104 may determine at some later time that window 102 has been moved from the open position to another position, either opened further or moved towards a closed position. In one embodiment, barrier sensor 104 is configured to determine which direction window 102 has been further moved, either towards a more-open position or towards a more-closed position.

At block 620, barrier sensor 104 determines whether someone was inside the premises in proximity to window 102 near the time that window 102 was moved from the open position.

At block 622, in response to determining that window 102 was moved from the open position, barrier sensor 104 generates and transmits a status message to receiver 116, indicating that window 102 was moved from the open position and that either a) no one was inside the premises in proximity to window 102 near the time when window 102 was moved or that b) someone was inside the premises in proximity to window 102 near the time when window 102 was moved.

At block 624, receiver 116 receives the status message and forwards it to remote server 126 via wide-area network 122.

At block 626, the status message is received by processor 500 of remote server 126 via network interface 504.

At block 628, processor 500 evaluates the status message and processes it to determine if it should cause an escalated alarm response to occur.

At block 630, when processor 500 determines that the status message indicates that window 102 has been moved from the open position and that there is no one inside the premises and in proximity to window 102 near the time that window 102 was moved while security system 130 is in an armed-home mode of operation, processor 500 causes an escalated alarm response to occur, as explained above.

At block 632, when processor 500 determines that the status message indicates that window 102 has been moved and that there is someone inside the premises and in proximity to window 102 near the time that window 102 was moved from the open position while security system 130 is in an armed-home mode of operation, processor 500 refrains from causing an escalated alarm response from occurring.

At block 634, processor 500 may update a record stored in memory 502, indicating that window 102 was moved by either an authorized person or an unauthorized person, along with a date and a time that the movement occurred.

At block 636, in an embodiment where barrier sensor 104 is able to distinguish directionality of window 102 while it is being moved from the open position, i.e., further opened or less open, the status message transmitted after window 102 has been moved from the open position may comprise an indication of the direction of movement.

At block 638, processor 500 refrains from causing an escalated alarm response from occurring when the status message indicates that window 102 has been moved from the open position, but that the direction of movement is towards a closed position. Conversely, processor 500 causes an escalated alarm response when the status message indicates that window 102 has been moved from the open position, but that the direction of movement is towards a more-open position, and that no one is inside the premises and in proximity to window 102.

Figure 7:
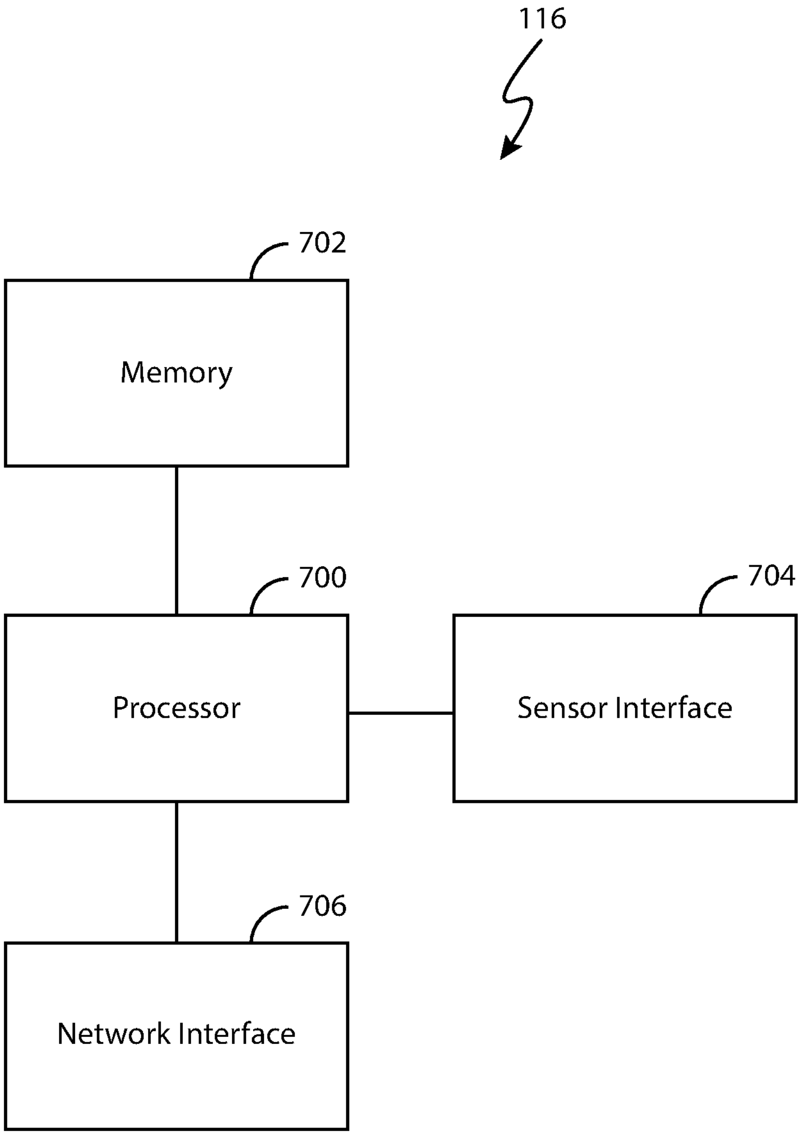
FIG. 7 is a functional block diagram of an example receiver when the receiver comprises a security panel.

FIG. 7 is a functional block diagram of one embodiment of receiver 116 when receiver 116 comprises a security panel, i.e., a unit in communication with one or more barrier sensors that determines whether to initiate escalated alarm responses when status messages are received from one or more of the barrier sensors. Specifically, FIG. 7 shows processor 700, memory 702, sensor interface 704 and network interface 706. It should be understood that the functional blocks may be coupled to one another in a variety of ways, and that not all functional blocks necessary for operation of the barrier sensor are shown (such as a power supply), for purposes of clarity.

Processor 700 is configured to provide general operation of receiver 116 by executing processor-executable instructions stored in memory 702, for example, executable code. Processor 700 typically comprises one or more general purpose processors, such as a Pentium®-class microprocessor manufactured by Intel Corporation of Santa Clara, California, although other types of processors, such as one or more of a variety of microprocessors, microcomputers, and/or microcontrollers may be used alternatively. Processor 700 is typically selected based on its computational power and cost considerations.

Memory 702 is coupled to processor 700, comprising one or more non-transitory information storage devices, such as one or more static or dynamic memory devices, such as RAM, ROM, flash, or some other combination of electronic, optical, or mechanical memory devices. Memory 702 is used to store processor-executable instructions for operation of receiver 116 as well as any information used by receiver 116, such as threshold information, parameter information, identification information, current or previous door or window status information, etc. It should be understood that in some embodiments, at least a portion of memory 702 is physically integrated with processor 700.

Sensor interface 704 is coupled to processor 700, comprising well-known radio-frequency reception circuitry, such as RF, Bluetooth, Wi-Fi, or some other circuitry that allows receiver 116 to receive, and in some cases additionally transmit, information from a plurality of barrier sensors.

Network interface 706 is coupled to processor 700, comprising well-known circuitry for allowing receiver 116 to communicate with network-capable devices, such as one or more wireless sirens, one or more strobe lights, and/or remote monitoring center 124. Typically, network interface 706 comprises IP-packet-based technology. In some embodiments, receiver 116 may communicate with local devices such as sirens and strobe lights via sensor interface 704.

Figure 8A:
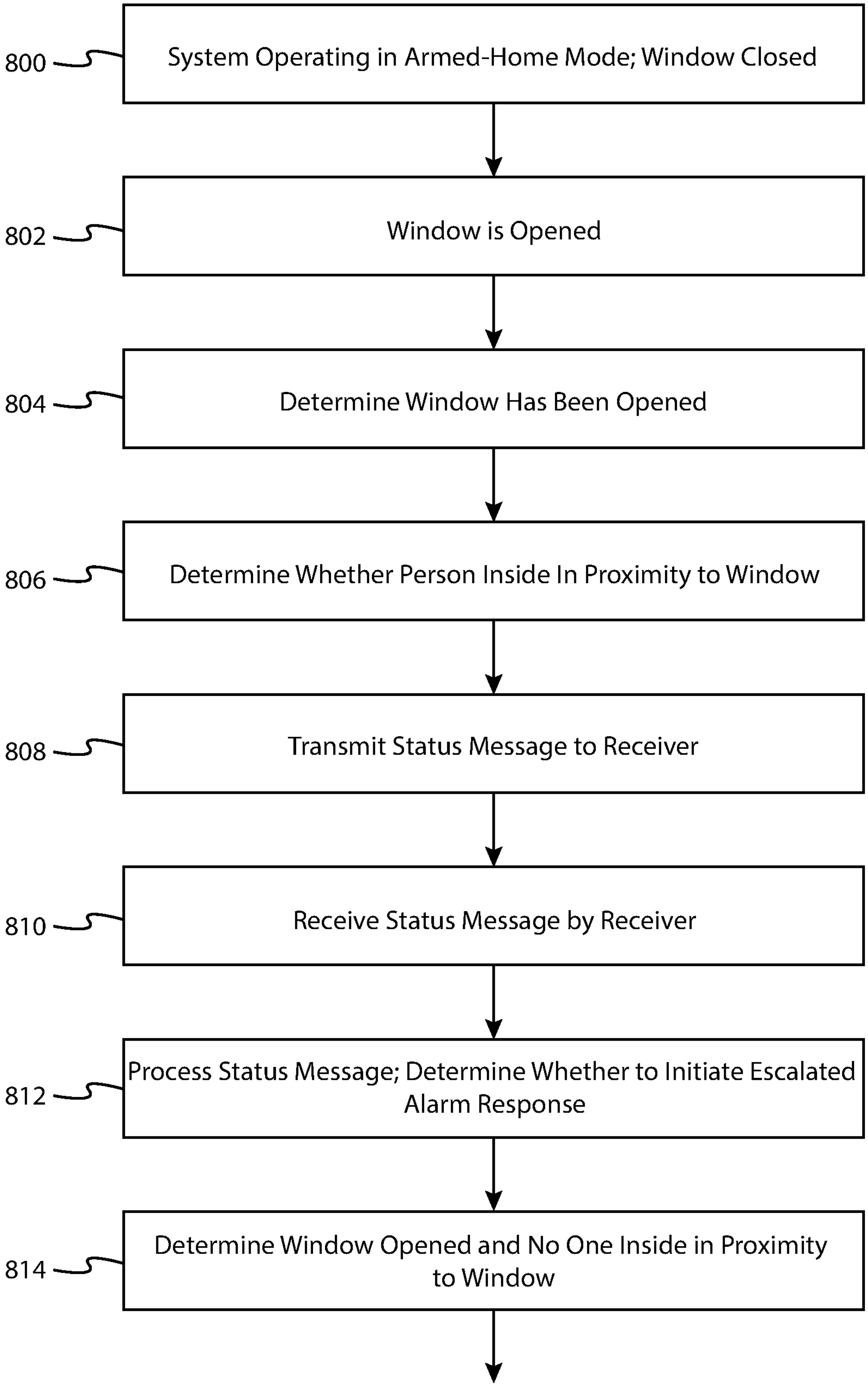
FIGS. 8A-8C represent a flow diagram illustrating one embodiment of a method performed by the receiver as shown in FIGS. 1 and 7, for allowing someone inside a premises monitored by the security system as shown in FIG. 1 to open a door or window without triggering an escalated alarm response, for leaving a door or window open while it is being actively monitored, and to cause an escalated alarm response if the security system is operating in an armed-home mode and a door or window monitored by a barrier sensor is moved from the open position by a person not inside the premises.
Figure 8B:
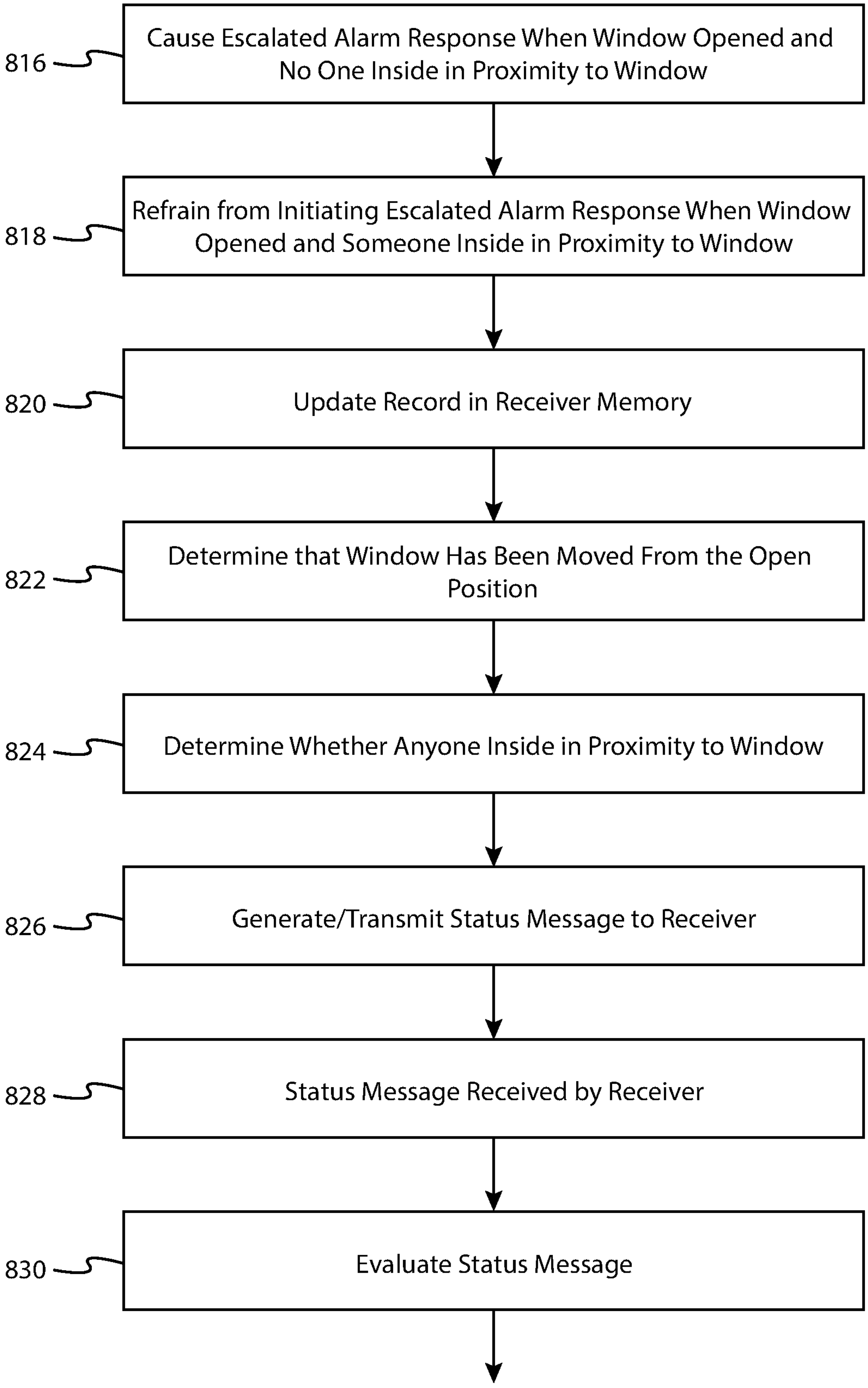
Figure 8C:
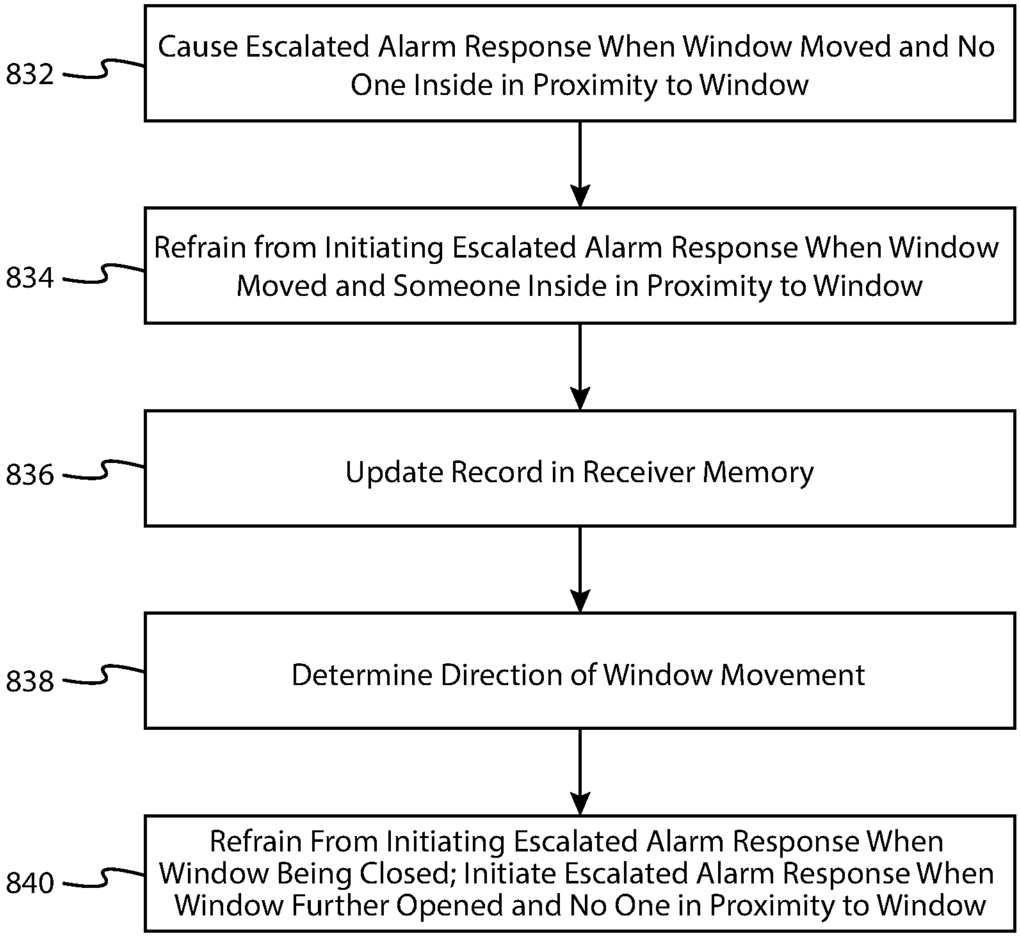

FIG. 8 is a flow diagram illustrating one embodiment of a method performed by receiver 116 for allowing someone inside a premises monitored by receiver 116 to open a door or window without triggering an escalated alarm response, for leaving a door or window open while it is being actively monitored, and to cause an escalated alarm response if the security system is operating in an armed-home mode and a door or window monitored by a barrier sensor is moved from the open position by a person not inside the premises. It should be understood that in some embodiments, not all of the steps shown in FIG. 8 are performed. It should also be understood that the order in which the steps are carried out may be different in other embodiments.

In the following discussion, it is assumed that barrier sensor 104 is monitoring window 102. It should be understood that the concepts discussed below may be equally applicable to other uses of barrier sensor 104, such as use as a door sensor monitoring door 100.

At block 800, receiver 116 is operating in an armed-home mode of operation, in communication with barrier sensor 104 via sensor interface 704. Window 102 is closed.

At block 802, window 102 is opened.

At block 804, barrier sensor 104 determines that window 102 was opened.

At block 806, barrier sensor 104 determines if anyone was inside the premises and in proximity to window 102 near the time that window 102 was opened.

At block 808, barrier sensor 104 transmits a status message to receiver 116, indicating that window 102 was opened and whether anyone was inside the premises in proximity to window 102 near the time that window 102 was opened.

At block 810, receiver 116 receives the status message and provides it to processor 700 via sensor interface 704.

At block 812, processor 700 evaluates the status message and processes it to determine if it should cause an escalated alarm response to occur.

At block 814, processor 700 may determine that the status message indicates that window 102 was opened and that there was no one inside the premises and in proximity to window 102 near the time that window 102 was opened while security system 130 was in an armed-home mode of operation.

At block 816, in response to determining that window 102 was opened and that there was no one inside the premises and in proximity to window 102 near the time that window 102 was opened while security system 130 was in an armed-home mode of operation, processor 700 causes an escalated alarm response to occur. Generally, processor 700 sends instructions to one or more local sirens and/or strobe lights coupled to receiver 116 via network interface 706 to sound a loud siren or illuminate a strobe light, respectively. Processor 700 may also, as part of the escalated alarm response, contact remote monitoring center 124 via network interface 706 to alert remote monitoring center 124 of a potential break in at the premises. Processor 700 may also, as part of the escalated alarm response, send a notification to one or more interested parties via text message, email or a phone call via network interface 706 and wide-area network 122 that a potential break in at the premises has occurred.

At block 818, processor 700 may determine that the status message indicates that window 102 has been opened and that there is someone inside the premises and in proximity to window 102 near the time that window 102 was opened while security system 130 is in an armed-home mode of operation. In response, processor 700 refrains from causing an escalated alarm response to occur.

At block 820, processor 700 may update a record stored in memory 702, indicating that window 102 was opened by an authorized or unauthorized person, as the case may be, along with a date and a time that the opening occurred.

At block 822, after window 102 has been opened and no escalated alarm response was executed, barrier sensor 104 determines that window 102 has been moved from the open position to another position, either opened further or moved towards a closed position. In one embodiment, barrier sensor 104 is configured to determine which direction window 102 has been further moved, either towards a more-open position or towards a more-closed position.

At block 824, barrier sensor 104 determines whether someone was inside the premises in proximity to window 102 near the time that window 102 was moved from the open position.

At block 826, in response to determining that window 102 was moved from the open position, barrier sensor 104 generates and transmits a status message to receiver 116, indicating that window 102 was moved from the open position and that either a) no one was inside the premises in proximity to window 102 near the time when window 102 was moved or that b) someone was inside the premises in proximity to window 102 near the time when window 102 was moved.

At block 828, receiver 116 receives the status message via sensor interface 704 and provides the status message to processor 700.

At block 830, processor 700 evaluates the status message and processes it to determine if it should cause an escalated alarm response to occur.

At block 832, when processor 700 determines that the status message indicates that window 102 has been moved from the open position and that there is no one inside the premises and in proximity to window 102 near the time that window 102 was moved while security system 130 is in an armed-home mode of operation, processor 700 causes an escalated alarm response to occur, as explained above.

At block 834, when processor 700 determines that the status message indicates that window 102 has been opened and that there is someone inside the premises and in proximity to window 102 near the time that window 102 was opened while security system 130 is in an armed-home mode of operation, processor 700 refrains from causing an escalated alarm response to occur.

At block 836, processor 700 may update a record stored in memory 702, indicating that window 102 was moved by either an authorized person or an unauthorized person, along with a date and a time that the movement occurred.

At block 838, in an embodiment where barrier sensor 104 is able to distinguish directionality of window 102 while it is being moved from the open position, i.e., further opened or less open, the status message transmitted after window 102 has been moved from the open position may comprise an indication of the direction of movement.

At block 840, processor 700 refrains from causing an escalated alarm response to occur when the status message indicates that window 102 has been moved from the open position, but that the direction of movement is towards a closed position. In one embodiment, refrainment occurs only when someone is inside the premises and in proximity to window 102 near the time when window 102 was moved. In another embodiment, processor 700 does not consider whether someone is inside the premises and in proximity to window 102 in determining whether to cause an escalated alarm response to occur, because if window 102 is being closed, it should not matter whether an authorized or unauthorized person is moving window 102 towards a more-closed position. In this embodiment, barrier sensor 104 may be configured to only transmit an indication that window 102 was moved and that was moved towards a closed position. In yet another embodiment, barrier sensor 104 is configured not to transmit a status message when window 102 is moved from the open position and towards a closed position, whether or not a person is inside the premises and in proximity to window 102.

Conversely, processor 700 may cause an escalated alarm response when the status message indicates that window 102 has been moved from the open position, but that the direction of movement is towards a more-open position, and that no one is inside the premises and in proximity to window 102.

Figure 9A:
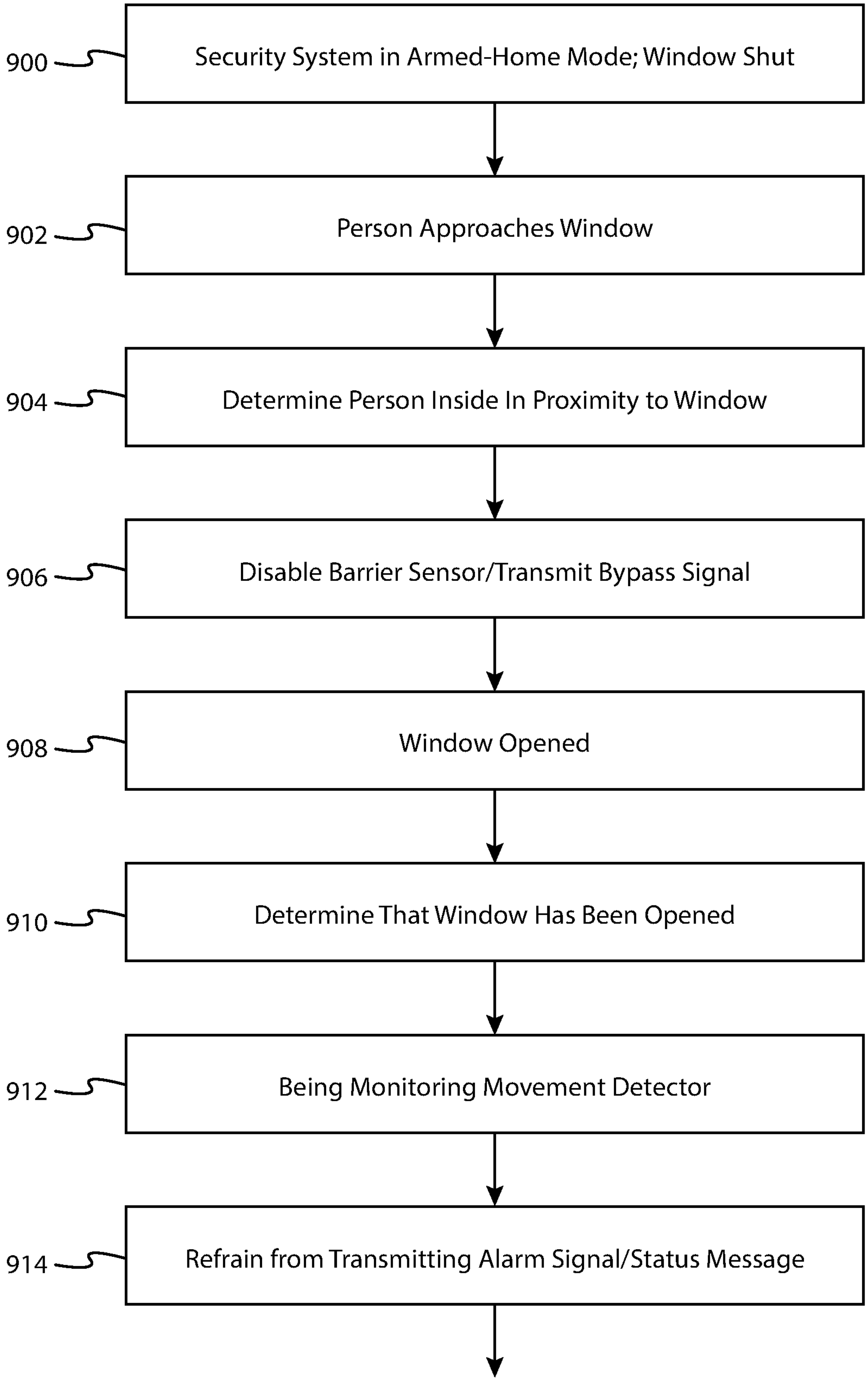
FIGS. 9A-9B represent a flow diagram illustrating one embodiment of a method performed by the barrier sensor shown in FIGS. 1-3 for automatically disabling the barrier sensor any time a person is inside a premises and in proximity to a barrier being monitored by the barrier sensor.
Figure 9B:
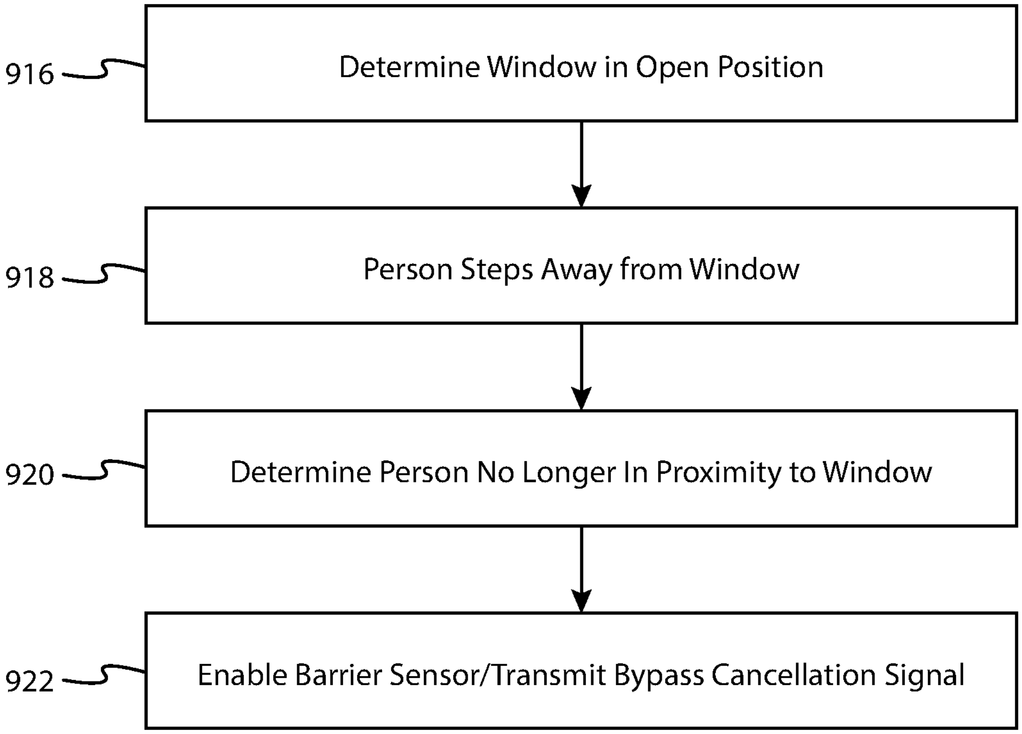

FIG. 9 is a flow diagram illustrating one embodiment of a method performed by barrier sensor 104 for automatically disabling barrier sensor 104 any time a person is inside a premises and in proximity to a barrier being monitored by barrier sensor 104. For purposes of this discussion, "disabling" means either preventing barrier sensor 104 from transmitting alarm signals or transmitting a bypass signal to receiver 116 or remote server 126. This allows someone inside a premises monitored by receiver 116 or remote server 126 to open a door or window without triggering an escalated alarm response, for leaving a door or window open while it is being actively monitored, and to cause an escalated alarm response if the security system is operating in an armed-home mode and a door or window monitored by a barrier sensor is moved from the open position by a person not inside the premises. It should be understood that in some embodiments, not all of the steps shown in FIG. 9 are performed. It should also be understood that the order in which the steps are carried out may be different in other embodiments.

In the following discussion, it is assumed that barrier sensor 104 is monitoring window 102. It should be understood that the concepts discussed below may be equally applicable to other uses of barrier sensor 104, such as use as a door sensor monitoring door 100.

At block 900, receiver 116 or remote server 126 is operating in an armed-home mode of operation and window 102 is shut. Processor 300 monitors signals from barrier status detection device 306 to determine when window 102 has been opened. In one embodiment, processor does not monitor movement detector 308 when window 102 is shut. In another embodiment, processor 300 monitors both barrier status detection device 306 and movement detector 308 to determine when window 102 has been opened, typically by determining when the barrier status detection device 306 indicates that window 102 has been opened, i.e., a change in state of the reed switch is detected and movement detector 308 indicates that window 102 is experiencing some degree of acceleration from movement of window 102 from the closed position.

At block 902, a person inside the premises approaches window 102 and is in proximity to window 102.

At block 904, processor 300 determines that a person is inside the premises and in proximity to window 102, as explained above using human detection device 304.

At block 906, in response to determining that a person is inside the premises and in proximity to window 102, processor 300 disables barrier sensor 104. In one embodiment, processor 300 disables barrier sensor 104 by refraining to transmit an alarm signal when processor 300 detects that window 102 has been opened. In another embodiment, processor 300 generates and causes transmitter 310 to transmit a bypass signal to receiver 116 or remote server 126 instructing receiver 116 or remote server 126 to ignore future alarm signals from barrier sensor 14 until further notice. In another embodiment, processor 300 transmits a status message to receiver 116 or remote server 126 indicating that a person is inside the premises in proximity to window 102, so that receiver 116 or remote server 126 can determine whether to initiate an escalated alarm response.

Processor 300 may disable barrier sensor for a predetermined time period, during the time that the person is inside the premises and in proximity to window 102, or until a second predetermined time period has elapsed after the person is no longer in proximity to window 102.

At block 908, while barrier sensor 104 is disabled, the person opens window 102.

At block 910, processor 300 determines that window 102 has been opened as a result of processing signals from barrier status detection device 306.

At block 912, processor 300 may being to monitor movement detector 308 as a result of determining that window 102 has been opened in an embodiment where processor 300 monitors only barrier status detection device 304 to determine whether window 102 has been opened.

At block 914, in one embodiment, processor 300 refrains from transmitting an alarm signal to receiver 116 or 126 upon determining that window 102 was opened. In another embodiment where a bypass signal was previously transmitted, processor 300 transmits an alarm signal to receiver 116 or remote server 126, where receiver 116 or remote server 126 may log the event, but not cause an escalated alarm response to occur. In yet another embodiment, processor 300 transmits a status message indicating that window 102 has been opened.

At block 916, after window 102 has been opened, processor 300 may determine that window 102 is in an open position when signals from movement detector 308 indicate that window 102 has stopped moving for a predetermined time period.

At block 918, the person who opened window 102 steps away from window 102.

At block 920, processor 300 determines that the person is no longer in proximity to window 102 by processing signals from human detection device 304.

At block 922, processor 300 enables barrier sensor 104 as a result of determining that the person is no longer in proximity to window 102. In one embodiment, enabling barrier sensor 104 comprises transmitting an alarm signal when processor 300 determines that window 102 has been moved from the open position to a new position and that no one is inside the premises in proximity to window 102. In another embodiment, enabling barrier sensor 104 comprises transmitting, by processor 300 via transmitter 310, a bypass cancellation signal to receiver 116 or remote server 126. The bypass cancellation signal instructs receiver 116 or remote server 126 to begin processing alarm signals transmitted from barrier sensor 104 to cause an escalated security response when an alarm signal is received and security system 130 is in an armed-home mode of operation. In yet another embodiment, enabling barrier sensor 104 comprises allowing transmission of status indications, such as a window status indication and a person status indication.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A barrier sensor coupled to a barrier, comprising:
a barrier status detection device for detecting when the barrier moves from a closed position into an opened position;
an infrared or ultrasonic human detection device for determining when a human being is inside a monitored premises in proximity to the barrier;
a transmitter for transmitting an alarm signal to a receiver;
a memory having processor-executable instructions stored thereon; and
a processor coupled to the human detection device, the barrier status detection device, the transmitter and the memory, the processor for executing the processor-executable instructions that causes the barrier sensor to:
determine, via use of the human detection device, that a human being is inside the premises in proximity to the barrier sensor; and
in response to determining that the human being is inside the premises in proximity to the barrier sensor, cause the barrier sensor to ignore signals from the barrier status detection device or refrain from transmitting an alarm signal via use of the transmitter.

2. The barrier sensor of claim 1, wherein the processor-executable instructions comprise further instructions that causes the barrier sensor to:
determine that the human being is no longer in proximity to the barrier; and
in response to determining that the human being is no longer in proximity to the barrier, re-enable the barrier sensor.

3. The barrier sensor of claim 1, further comprising:
a movement detector coupled to the processor for detecting when the barrier has been moved from an open position;
wherein the processor-executable instructions comprise further instructions that causes the barrier sensor to:
determine, based on one or more electronic signals from the movement detector, that the barrier has been placed into the open position;
determine, based on one or more other electronic signals from the movement detector, that the barrier has been moved from the open position; and
in response to determining that the barrier has been moved from the open position, transmit an alarm signal to a receiver.

4. The barrier sensor of claim 1, further comprising:
a barrier status detection device coupled to the processor for detecting when the barrier has been opened; and
a movement detector coupled to the processor for detecting when the barrier has been moved from an open position;
wherein the processor-executable instructions comprise further instructions that causes the barrier sensor to:
determine, based on one or more electronic signals from the barrier status detection device, that the barrier has been placed into the open position;
determine, based on one or more other electronic signals from the movement detector, that the barrier has been moved from the open position; and
in response to determining that the barrier has been moved from the open position, transmit an alarm signal to a receiver.

5. The barrier sensor of claim 1, further comprising:
a movement detector coupled to the processor for detecting when the barrier has been moved from an open position;
wherein the processor-executable instructions comprise further instructions that causes the barrier sensor to:
monitor the barrier status detection device until the barrier has been opened; and
after detecting that the barrier has been opened, begin to monitor the movement detector to determine when the barrier has been moved from the open position.

6. The barrier sensor of claim 1, further comprising:
a movement detector coupled to the processor for detecting when the barrier has been moved from an open position;
wherein the processor-executable instructions comprise further instructions that causes the barrier sensor to:
monitor the barrier status detection device until the barrier has been opened;
after detecting that the barrier has been opened, begin to monitor the movement detector to determine when the barrier has been moved from the open position; and
after beginning monitoring of the movement detector, stop monitoring the barrier status detection device.

7. The barrier sensor of claim 6, wherein the processor-executable instructions comprise further instructions that causes the barrier sensor to:
determine that the barrier has been closed after determining that the barrier was in the open position; and
in response to determining that the barrier has been closed, begin to monitor the barrier status detection device to determine when the barrier has been re-opened.

8. A method performed by a barrier sensor coupled to a barrier comprised of a barrier status detection device for detecting when the barrier moves from a closed position into an opened position, an infrared or ultrasonic human detection device for determining when a human being is inside a monitored premises in proximity to the barrier, and a transmitter for transmitting an alarm signal to a receiver, comprising:
determining, via use of the human detection device, that a human being is inside the premises in proximity to the barrier sensor; and
in response to determining that the human being is inside the premises in proximity to the barrier sensor, causing the barrier sensor to ignore signals from the barrier status detection device or refrain from transmitting an alarm signal via use of the transmitter.

9. The method of claim 8, further comprising:
determining that the human being is no longer in proximity to the barrier; and
in response to determining that the human being is no longer in proximity to the barrier, re-enabling the barrier sensor.

10. The method of claim 8, further comprising:
determining that the barrier has been placed into an open position;
determining that the barrier has been moved from the open position; and
in response to determining that the barrier has been moved from the open position, transmitting an alarm signal to a receiver.

11. The method of claim 8, further comprising:
determining that the barrier has been placed into an open position;
determining that the barrier has been moved from the open position; and
in response to determining that the barrier has been moved from the open position, transmitting an alarm signal to a receiver.

12. The method of claim 8, further comprising:

monitoring the barrier status detection device of the barrier sensor until the barrier has been opened; and after detecting that the barrier has been opened, begin monitoring a movement detector of the barrier sensor to determine when the barrier has been moved from the open position.

13. The method of claim 8, further comprising:

monitoring the barrier status detection device of the barrier sensor until the barrier has been opened;

after detecting that the barrier has been opened, begin monitoring a movement detector of the barrier sensor to determine when the barrier has been moved from the open position; and after beginning monitoring of the movement detector, stop monitoring the barrier status detection device.

14. The method of claim 13, further comprising:

determining that the barrier has been closed after determining that the barrier was in the open position; and in response to determining that the barrier has been closed, begin monitoring the barrier status detection device to determine when the barrier has been re-opened.

* * * * *